US008010961B1

(12) United States Patent
Cook et al.

(10) Patent No.: US 8,010,961 B1
(45) Date of Patent: *Aug. 30, 2011

(54) DATA LAYER PRIORITIZATION IN AN APPLICATION LAYERED SYSTEM

(75) Inventors: Randall Cook, Springville, UT (US); Jared Blaser, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 1548 days.

This patent is subject to a terminal disclaimer.

(21) Appl. No.: 11/324,375

(22) Filed: Jan. 3, 2006

Related U.S. Application Data

(63) Continuation-in-part of application No. 10/459,936, filed on Jun. 11, 2003, now Pat. No. 7,117,495, and a continuation-in-part of application No. 10/459,768, filed on Jun. 11, 2003, now Pat. No. 7,162,724, and a continuation-in-part of application No. 10/459,870, filed on Jun. 11, 2003, now Pat. No. 7,165,260, and a continuation-in-part of application No. 11/026,520, filed on Dec. 30, 2004, now Pat. No. 7,620,956, and a continuation-in-part of application No. 11/027,489, filed on Dec. 30, 2004, now Pat. No. 7,496,931, and a continuation-in-part of application No. 11/081,856, filed on Mar. 16, 2005, now Pat. No. 7,512,977, and a continuation-in-part of application No. 11/082,194, filed on Mar. 16, 2005, now Pat. No. 7,549,164.

(51) Int. Cl.
*G06F 9/445* (2006.01)
(52) U.S. Cl. .................. 717/174; 707/783; 713/165
(58) Field of Classification Search .................. None
See application file for complete search history.

(56) References Cited

U.S. PATENT DOCUMENTS

| 5,313,646 A | 5/1994 | Hendricks |
| 5,537,539 A | 7/1996 | Narihiro |

(Continued)

FOREIGN PATENT DOCUMENTS

EP 0579368 * 6/1993

OTHER PUBLICATIONS

Shetern, "Core C++ A Software Engineering Approach", Jul. 2000, Prentice Hall, section "Input and Output With Disk Files".*
U.S. Appl. No. 11/026,520, filed Dec. 30, 2004, Cook et al.
U.S. Appl. No. 11/901,327, filed Sep. 17, 2007, Greenwood et al.
U.S. Appl. No. 11/528,858, filed Sep. 28, 2006, Cook et al..

(Continued)

*Primary Examiner* — Lewis A Bullock, Jr.
*Assistant Examiner* — Jue Wang
(74) *Attorney, Agent, or Firm* — Advantedge Law Group

(57) ABSTRACT

The inventions relate generally to layered computing systems that provide public access to the content of the layers. Also disclosed herein are prioritization schemes usable in a layered computing system, including prioritization by layer type, by assigned priority weights, by access type, by sub-layers and by read-write indicators. Processes may further be associated to layers from which they originate, and priority given to associated layers thereby. Association may also be provided for installer services, thereby depositing an applications updates into its layer. Layers may also contain file reference information including exclusion or inclusion entries indicating what files may be written thereto. Paths recorded in layers may also embed variables to true paths on a layered system. Detailed information on various example embodiments of the inventions are provided in the Detailed Description below, and the inventions are defined by the appended claims.

20 Claims, 11 Drawing Sheets

U.S. PATENT DOCUMENTS

| | | | |
|---|---|---|---|
| 5,561,799 A | 10/1996 | Khalidi | |
| 5,586,304 A | 12/1996 | Stupek, Jr. et al. | |
| 5,832,501 A * | 11/1998 | Kain et al. | 707/204 |
| 5,857,207 A * | 1/1999 | Lo et al. | 707/203 |
| 5,870,734 A * | 2/1999 | Kao | 707/2 |
| 5,905,990 A | 5/1999 | Inglett | |
| 5,930,513 A | 7/1999 | Taylor | |
| 5,933,647 A | 8/1999 | Aronberg et al. | |
| 5,991,402 A | 11/1999 | Jia | |
| 5,991,753 A | 11/1999 | Wilde | |
| 6,026,402 A * | 2/2000 | Vossen et al. | 707/9 |
| 6,161,218 A | 12/2000 | Taylor | |
| 6,185,574 B1 | 2/2001 | Howard et al. | |
| 6,195,650 B1 * | 2/2001 | Gaither et al. | 707/1 |
| 6,336,175 B1 * | 1/2002 | Shaath et al. | 711/163 |
| 6,356,915 B1 | 3/2002 | Chtchetkine | |
| 6,366,900 B1 | 4/2002 | Hu | |
| 6,374,402 B1 | 4/2002 | Schmeidler et al. | |
| 6,381,735 B1 | 4/2002 | Hunt | |
| 6,453,468 B1 | 9/2002 | D'Souza | |
| 6,716,102 B2 * | 4/2004 | Whitten et al. | 463/43 |
| 6,839,709 B2 * | 1/2005 | Cormack et al. | 707/10 |
| 7,024,403 B2 * | 4/2006 | Kyler | 707/3 |
| 7,024,693 B2 * | 4/2006 | Byrne | 726/21 |
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 7,197,516 B1 * | 3/2007 | Hipp et al. | 707/200 |
| 7,461,096 B1 | 12/2008 | Hurren et al. | |
| 7,467,158 B2 * | 12/2008 | Marinescu | 707/103 |
| 7,496,931 B2 | 2/2009 | Cook et al. | |
| 7,512,977 B2 | 3/2009 | Cook et al. | |
| 7,549,164 B2 | 6/2009 | Cook et al. | |
| 7,555,483 B2 * | 6/2009 | Maeda et al. | 707/10 |
| 7,599,907 B2 * | 10/2009 | Havewala et al. | 707/2 |
| 7,680,758 B2 * | 3/2010 | Laborczfalvi et al. | 707/999.001 |
| 2002/0143764 A1 * | 10/2002 | Martin et al. | 707/8 |
| 2002/0157089 A1 | 10/2002 | Patel et al. | |
| 2002/0174215 A1 | 11/2002 | Schaefer | |
| 2003/0033441 A1 | 2/2003 | Forin et al. | |
| 2003/0140051 A1 * | 7/2003 | Fujiwara et al. | 707/100 |
| 2003/0195933 A1 * | 10/2003 | Curren et al. | 709/206 |
| 2003/0233489 A1 | 12/2003 | Blaser et al. | |
| 2003/0233490 A1 | 12/2003 | Blaser et al. | |
| 2003/0233647 A1 | 12/2003 | Blaser et al. | |
| 2005/0169073 A1 | 8/2005 | Cook et al. | |
| 2005/0172279 A1 | 8/2005 | Cook et al. | |
| 2005/0240761 A1 * | 10/2005 | Yui | 713/165 |
| 2005/0257265 A1 | 11/2005 | Cook et al. | |
| 2005/0257266 A1 | 11/2005 | Cook et al. | |

OTHER PUBLICATIONS

Non-final Office Action received in U.S. Appl. No. 11/026,520, filed Mar. 31, 2009.
Search Report and Written Opinion received in related European Application No. EP 8164483.3; Feb. 9, 2009.
Sipek, Josef et al.; "Kernel Support for Stackable File Systems;" Proceedings of the Linux Symposium; Jul. 27, 2007; pp. 223-228; Canada.
Quigly, D.P. et al; "Unionfs: User-and-Community-Oriented Development of a Unification Filesystem;" Proceedings of the 2006 Linux Symposium; Jul. 2006; pp. 349-362, Canada.
Zadok, Erez et al.; "On Incremental File System Development;" ACM Transactions on Storage; May 2, 2006; vol. 2; pp. 1-33.
Wright, Charles et al.; "Kernel Korner:Unionfs: Bringing Filesystems Together;" Linux Journal; Dec. 1, 2004; pp. 1-6; vol. 2004 No. 128; Westport, CT, US.
Zadok, E. et al.; "Fist: A Language for Stackable File Systems;" Proceedings of the Usenix Annual Technical Conference; Jan. 1, 2000; pp. 55-70.
Wright, Charles et al.; "Versatility and Unix Semantics in Namespace Unification;" ACM Transactions on Storage ACM; Nov. 1, 2005; pp. 1-29.
Jeff Tranter, "CD-ROM and Linux", Linux Journal, Nov. 11, 1994. Retrieved from the Internet:<URL:http://www.linuxjournal.com/article/2851>.
Jeff Tranter, "The Linux CD-ROM HOWTO", v. 1.2, Aug. 21, 1994. Retrieved from the Internet: <URL: (continued on the next line). http://www.ibiblio.org/pub/historic-linux/ftp-archives/sunsite.unc.edu/Nov-0 6-1994/docs/HOWTO/CDROM-HOWTO>.
Ifs.5.1.tar.gz source code tarball, retrieved from the Internet<URL:http://www.ibiblio.org/pub/historic-linux/ftp-archives/tsx-11.mit.edu/Oct-07-1996/ALPHA/ifs/>.
Ovlfs1.0.src.tgz source code tarball, retrieved from the Internet:<URL:http://wvvw.ibiblio.org/pub/Linux/system/filesystems/>.
Newcomb, "Softricity has cure for app conflict blues", Thin Planet website, May 2002, parts 1 and 2, Jupitermedia Corp.
"SystemGuard", www.softricity.com website, Apr. 24, 2003 or earlier.
"SoftGrid for Windows Desktops Transforms Business Applications into Web-enabled services, reshaping the economics of enterprise . . . ", www.softricity.com website, Oct. 15, 2001.
"Softricity secures $14.6 million in oversubscribed third round venture funding", www.softricity.com website, May 28, 2002.
"Microsoft and Softricity announce agreement to manage existing Windows applications with web services", www.softricity.com website, May 28, 2002.
"Softricity announces SoftGrid 2.0 first customer deployments and general availability", www.softricity.com website, May 6, 2002.
"Softricity unveils SoftGrid Dual-Mode", www.softricity.com website, Mar. 24, 2003.
"Softricity becomes premier member of Citrix Business Alliance", www.softricity.com website, Feb. 25, 2002.
"SoftGrid Sequencer", www.softricity.com website, Apr. 24, 2003 or earlier.
Longwell, "Softricity lowers price on Dual-Mode deployments", www.crn.com website, Mar. 28, 2003.
"Microsoft and Softricity announce agreement to manage existing Windows-based applications with Web services", a Microsoft website, May 28,2002.
"Softricity Data Sheet: Softricity SystemGuard: The foundation for stable on-demand application access", www.softricity.com website, Feb. 2002.
"Softricity Data Sheet: Softricity's patent-pending technology enables any application to run on any desktop . . . ", www.softricity.com website, Oct. 2002.
"Turning software into a service: there are no. silver bullets", www.softricity.com website, Apr. 24, 2003 or earlier.
"Softricity acquires intellectual property of Seaport Software to extend virtual installation technology", www.choicesolutions.com website, Nov. 18, 2002.
"Softricity SoftGrid Platform: Softricity platform training guide", www.softricity.com website, Apr. 24, 2003 or earlier.
"Clean Slate", http://www.fortres.com/products/cleanslate.htm, Jan. 13, 2004.
"FAQ—2001013", http://www.fortres.com/support/faqviewarticle.asp?ID=2001013, Oct. 24, 2004.
"FAQ—2001014", http://www.fortres.com/support/faqviewarticle.asp?ID=2001014, Nov. 25, 2003.
"FAQ—2001015", http://www.fortres.com/support/faqviewarticle.asp?ID=2001015, Nov. 23, 2003.
"FAQ—2001025", http://www.fortres.com/support/faqviewarticle.asp?ID-2001025, Dec. 15, 2003.
Fortres Grand Corporation, "Computer Security Software—A Lifesaver for Schools", www.fortres.com, May/Jun. 2001 (presumed from presented article: periodical not available).
"Clean Slate FAQ", http://www.fortres.com/products/cleanslate_faq.htm, Jan. 13, 2004.
"Awards", http://www.fortres.com/products/awards.htm#cleanslate, Jan. 13, 2004.
Microsoft Windows NT Resource Kit, 1993, Microsoft Press, vol. 1, pp. 325-346.
Heidemann, J.S., File-System Development with Stackable Layers, Feb. 1994, ACM Transactions on Computer Systems, vol. 12, No. 1, pp. 58-89.
Non-Final Office Action received in related U.S. Appl. No. 11/528,858, filed Sep. 9, 2010.

* cited by examiner

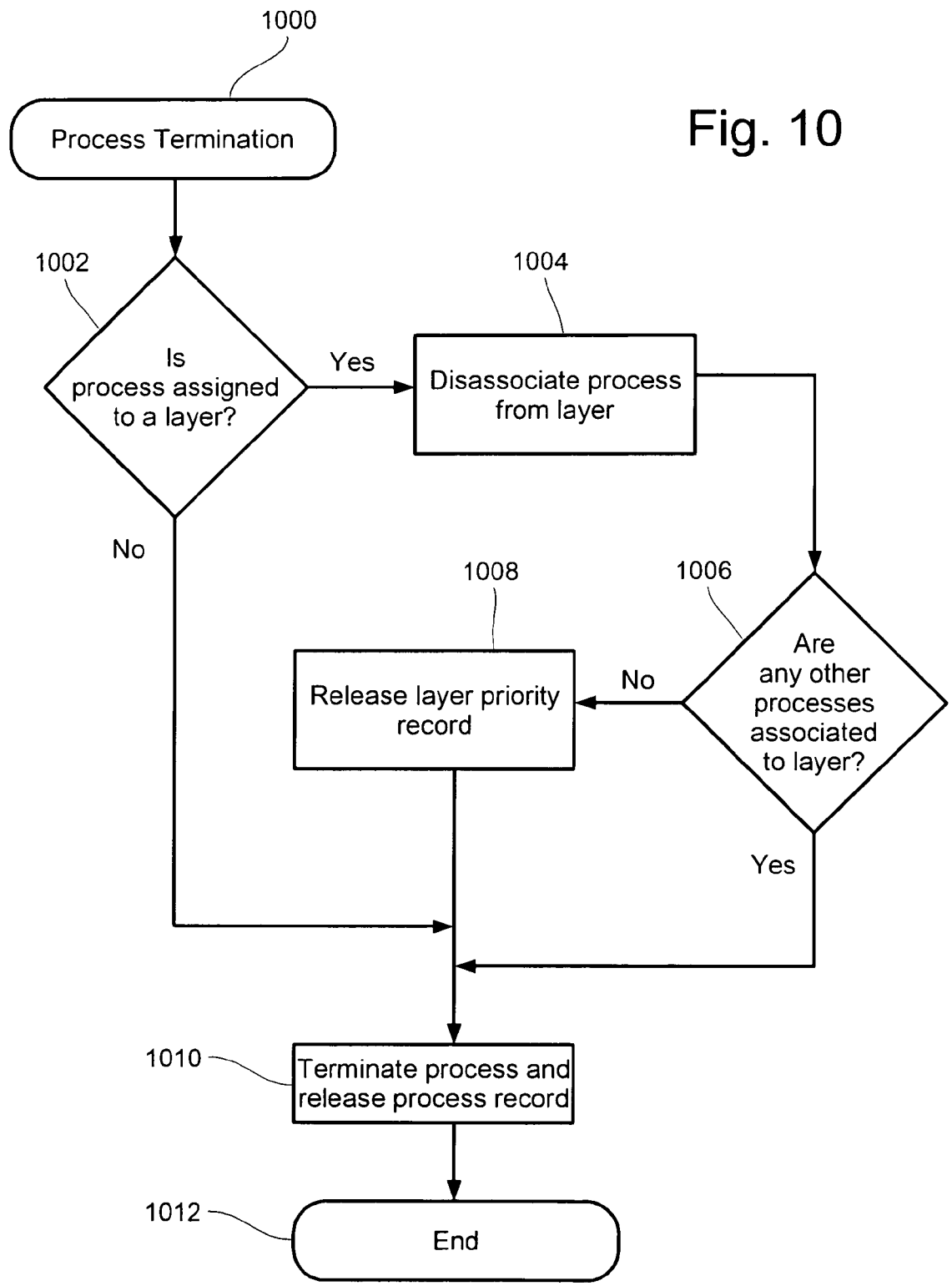

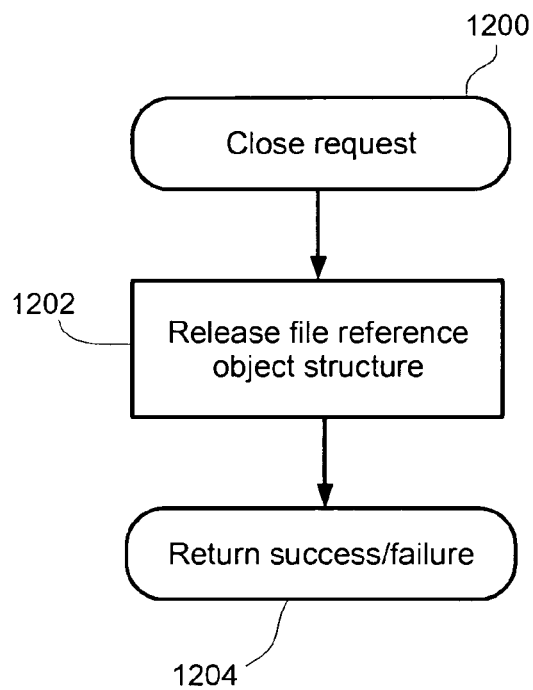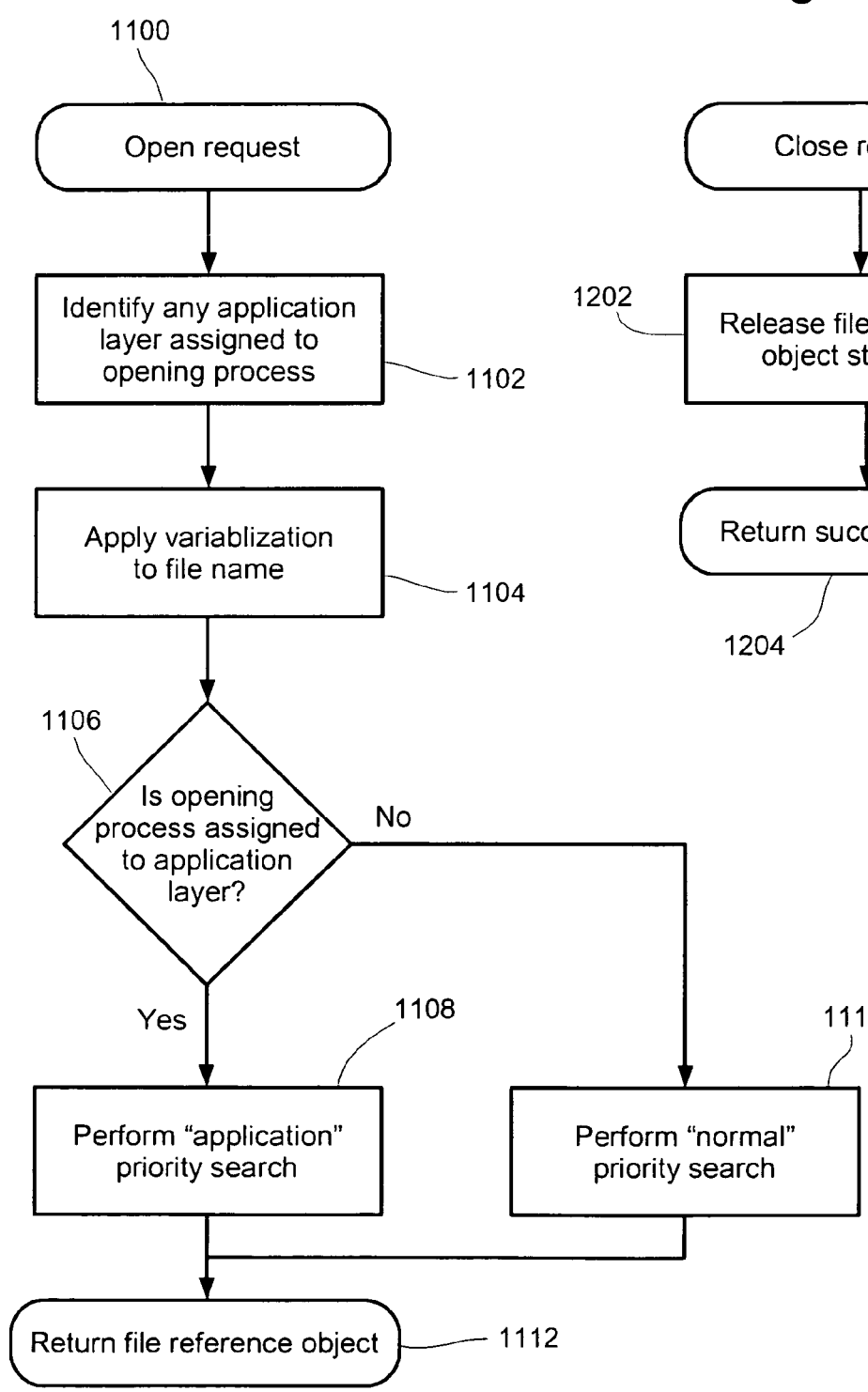

DATA LAYER PRIORITIZATION IN AN APPLICATION LAYERED SYSTEM

CROSS-REFERENCE TO RELATED APPLICATIONS

This application is a continuation-in-part of U.S. application Ser. Nos. 10/459,936 now U.S. Pat. No. 7,117,495, 10/459,768 now U.S. Pat. No. 7,162,724 and 10/459,870 now U.S. Pat. No. 7,165,260 filed Jun. 11, 2003, U.S. application Ser. Nos. 11/026,520 now U.S. Pat. No. 7,620,956 and 11/027,489 now U.S. Pat. No. 7,496,931 filed Dec. 30, 2004, and U.S. application Ser. Nos. 11/081,856 now U.S. Pat. No. 7,512,977 and 11/082,194 now U.S. Pat. No. 7,549,164 filed Mar. 16, 2005, each of which is hereby incorporated by reference in its entirety.

BACKGROUND OF THE INVENTIONS

In the last two decades computers have developed into sophisticated machines having powerful processors and large amounts of memory and local data storage. A modern computer has installed thereto a large operating system, which today includes not only low-level functions for accessing input, output and storage devices, but additionally libraries providing common functions to applications, graphical windowing systems, and applications to perform administrative functions, data access functions, and even multimedia and entertainment functions. The common practice of using applications requires the installation of an application's executable, configuration and data files to local storage, although some applications and systems extend this to use of network drives as well. Today's computers also multitask, and permit more than one application to be installed and executed thereon concurrently. This sophistication in the operating system in combination with the large number of potential applications from diverse sources has made the administration of a typical modern computer more difficult.

With the advent of graphical operating systems, users were offered a way to visually interact with a computer. This visual interaction made possible a new heirarchical organization to the computer presentation, typically including a top-level presentation, for example a 'desktop' with a top level 'start' menu, and further including sub-presentations such as application windows. Executing applications under that mode may be performed by acting on icons and menu items, relieving the user from the burden of having to know the logical location of items in a filesystem to use them. These icons, shortcuts, links and menu items all point to an executable or other object at their true reference points. If the reference object is moved to a different location in the filesystem heirarchy, the link to the object becomes broken and non-functional; in some operating systems the system may attempt to resolve the new location of the object and fix the link.

In personal computers of the early to mid-1980s, applications and data were typically stored to a floppy disk, with little to no other non-volatile storage available to programs. Those disks could be transported between computers of the same type, thereby making those applications portable. The execution of those applications, however, was from the command line, which required some user expertise. A user, for example, might need to know that an application's executable was located on drive '0' or 'a:'. Should an application disk be inserted to a second drive, the application might be required to be reconfigured to reference data and configuration objects on that second drive. The computer and operating system makers of the time largely left the problem of application mobility (moving an application to a different drive or location) unaddressed, which required users to maintain many applications in static locations even though stored to floppy disks.

Other types of portable storage have been used in the past. One early example was a cartridge including a read-only memory and a card-like interface mating to a socket, for example in a game console. Those cartridges contained no file-system, but rather were presented as instructions and data at particular addressable memory locations. In addition to floppy disks, mentioned above, high density magnetic media cartridges have been used, for example "Zip" disks. The improvement therein related mainly to the amount of data that could be stored on the portable media. Other examples include optical and magneto-optical disks, some of which are commonly known as CDs and DVDs. The advent of these permitted the cheap distribution of software and data, supplanting the use of floppy diskettes and permitting the growth of software applications to many megabytes. Those software makers have taken advantage of the increasingly large amounts of local hard drive storage for applications, and have largely not attempted installations other than to a local hard drive. Today, nearly all software packages perform an installation step in which the application's files are installed to a local hard drive of a computer.

Presently, the most convenient uses of applications require installation of an application to a local hard drive or use of applications stored on portable media in a known or determinable position in the filesystem heirarchy of the computer. In the latter use, the application might be used on more than one computer, provided that the user has sufficient expertise to configure the application and operating system with any necessary icons, drivers, and directory locations.

Additionally, prior computing systems have been susceptible to application conflicts with the host operating system (OS) and other applications. When an application is installed to an OS, a number of globally accessible files are often placed to the computing system, including for example shared libraries and system configuration. Those shared libraries are often provided in different versions, with applications requiring one version or another. A mismatch between a library version and a version required by an application sometimes results in that application crashing, becoming inoperable, or exhibiting other errors. Shared configuration elements are sometimes globally available to applications, which may write a favored configuration thereto. Following a write to that configuration other applications may be unable to read the configuration properly, or may be unable to function under a new specified configuration. Thus it is that following the installation of an application to a computer, other applications may stop working.

Installing a number of applications to a computer can be something of a black art. An administrator may, with good intentions and understanding, install several applications to a computer. Upon testing an installation or during use, the administrator or a user may discover that one or more applications operate errantly or not at all. It is sometimes not apparent which applications are in conflict. The administrator may enter a procedure in which applications are uninstalled from the computer in a process of elimination to find the offending applications. Sometimes de-installation programs do not remove all installed files, in which that procedure may fail to locate the problem. The administrator is then required to continue by creating a clean (or "virgin") installation, and installing applications one at a time until the problem is located.

When applications are found to conflict, a choice must usually be made as to which one will be installed. One of the applications is sometimes installed to a different computer to avoid the conflict. If conflicting applications must be installed to a single computer, a new version of at least one of the applications must be sought and purchased from the software vendors. A non-conflicting version may not be available, especially if a vendor is small, not supporting the application, or no longer in business.

Snapshot utilities are available, which generally operate to create a database of all files and registry settings on a computer. Prior to installing an application, a snapshot is taken of the files and registry settings. The application is then installed, and tested. If the application fails to work satisfactorily, the system can be restored by comparing the existing files and registry settings against the snapshot and removing installed files and otherwise restoring the system as before. Snapshot utilities have several limitations. First, if a newly installed application causes a prior installed application to fail, it is often not possible to simply revert to a snapshot made prior to older application installation, especially if there have been other applications installed in the interim. The administrator may be required to revert back to the earlier snapshot, and then re-install the intervening applications and the new application. Additionally, there are usually a limited number of snapshots that can be stored, and thus a required snapshot may not have been retained when found to be needed.

Likewise, a system may be restored to an earlier state if backups have been made. That restoration process, however, usually involves a significant amount of time and destroys all data recorded to the system after the time of the backup.

A current practice of maintaining computers is to image the hard drive of a computer while in a working state. If the computer becomes unstable, or if undesirable content appears on the computer, the computer's drive is restored using the earlier made image. This practice is lacking in that all changes made following the image creation are wiped off the system when the computer is restored, including user files and other applications.

Also, some applications are not provided with an uninstall program. To de-install those applications an administrator is required to know where the application files and settings reside in the system, and remove them manually.

BRIEF SUMMARY OF THE INVENTIONS

The inventions relate generally to layered computing systems that provide public access to the content of the layers. Also disclosed herein are prioritization schemes usable in a layered computing system, including prioritization by layer type, by assigned priority weights, by access type, by sublayers and by read-write indicators. Processes may further be associated to layers from which they originate, and priority given to associated layers thereby. Association may also be provided for installer services, thereby depositing an applications updates into its layer. Layers may also contain file reference information including exclusion or inclusion entries indicating what files may be written thereto. Paths recorded in layers may also embed variables to true paths on a layered system. Detailed information on various example embodiments of the inventions are provided in the Detailed Description below, and the inventions are defined by the appended claims.

BRIEF DESCRIPTION OF THE DRAWINGS

FIG. 10 visually depicts a method of releasing layer priority records on process termination events.

FIG. 11 illustrates one method of prioritizing layers for requests including a special search for processes assigned to application layers.

FIG. 12 illustrates activity for a close event in one exemplary layered system

Figure 1:
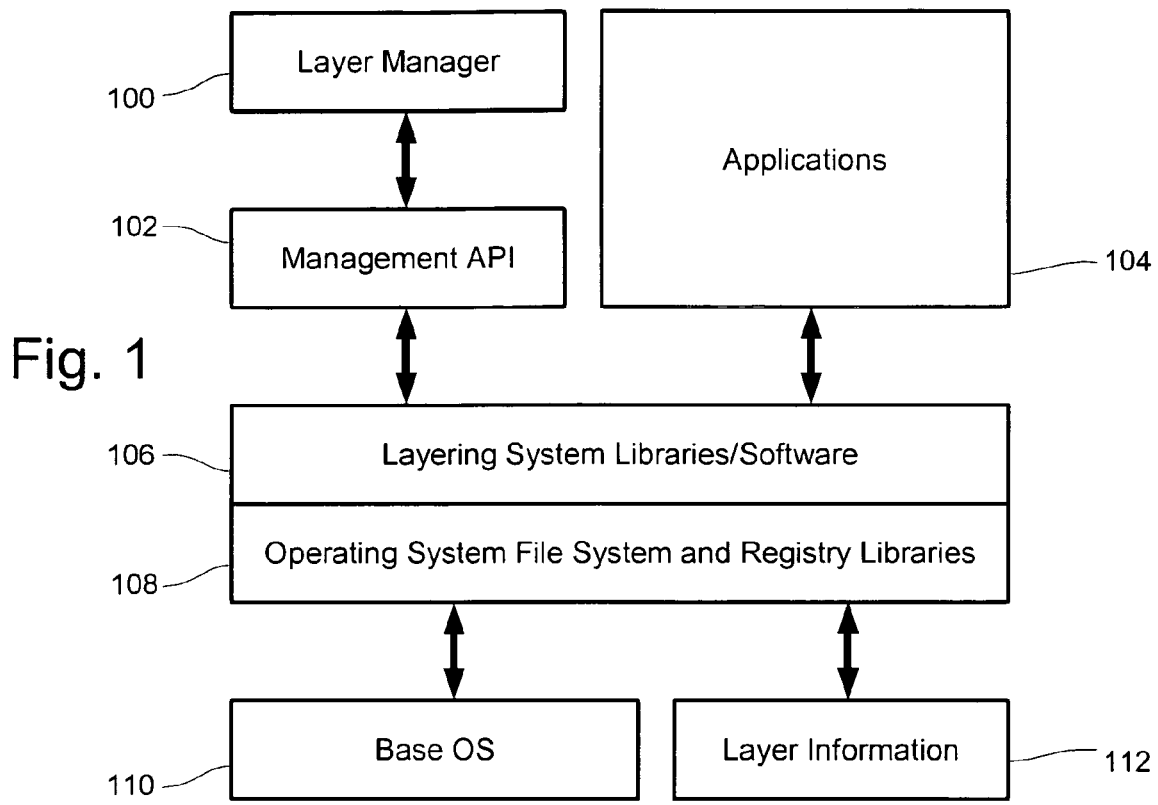
FIG. 1 conceptually illustrates the components of an examplary layered computing system.

Reference will now be made in detail to some embodiments of the inventions, example of which are illustrated in the accompanying drawings.

DETAILED DESCRIPTION

For the purpose of simplifying the discussion herein, several examplary computing devices are referenced. Those devices are typically a conventional personal computer or workstation having a CPU, memory, display, keyboard, mouse, and at least one fixed disk. It will be apparent to one of ordinary skill in the art that the concepts disclosed herein may apply equally to other computing systems that are not personal computers, for example diskless workstations, headless workstations or servers, embedded systems and many other types. Herein it is contemplated that the inventions may be applied to these and other computing systems, both existing and yet to be, using the methods and principles disclosed herein. Likewise, although many of the examples below refer to a system with a single base filesystem, the concepts, principles and examples disclosed below may be extended to provide layered services across several or many accessible filesystems, as will become apparent from the discussion below.

Likewise the discussion below speaks of registries and registry settings, which are specific to Microsoft Windows™ operating systems. It will be recognized that registry settings are merely configuration for the operating system and applications installed to a computing device, accessible through a system-wide API. The meaning of registries and registry settings is therefore extended to future Windows operating systems and operating systems other than Windows, where equivalent structures and access facilities exist thereon.

Other objects, methods and techniques are also discussed below in reference to particular examples; the reader will appreciate that the use of examples below is merely for convenience, and that the objects, methods and techniques disclosed herein may be applied beyond the examples without departing from the disclosed concepts.

General Concepts

A majority of the concepts disclosed herein relate to a layered filesystem. In an ordinary filesystem, an operating system applies a file pathname to a filesystem to reach a file object, which might exist, for example, as a series of data blocks on a hard disk. Some operating systems permit access to a plurality of filesystems, each existing in a confined name space. For example, in a Microsoft Windows environment a file name is preceded by a drive letter, for example "C:". A Linux operating system also utilizes prefixed directories; some Linux distributions provide for filesystems to be mounted under the "/mnt" namespace. In any case, such an operating system can determine the single location of access for a file by an evaluation of file pathname by extracting and examining the relevant portion thereof.

An operating system that supports filesystem layering can provide for more than one location of access for a particular file pathname. Such a layered operating system can therefore look in two or more repositories of file objects, which are referred to herein as filesystem layers or merely "layers." As there is more than one potential location for a file at a particular pathname, the operating system performs an extra computing step in order to determine the "owner" layer of an accessed file, which is the layer applied to the file access. For file read accesses, this generally requires a search of the layers in an order of priority to find the layer with highest priority that also contains a file object corresponding to the requested pathname. For write accesses, this generally requires a search of the layers, also in an order of priority, to determine the highest ranked layer to which the file may be written. For example, some of the layers might be configured to be read-only, while others are writable.

Figure 2:
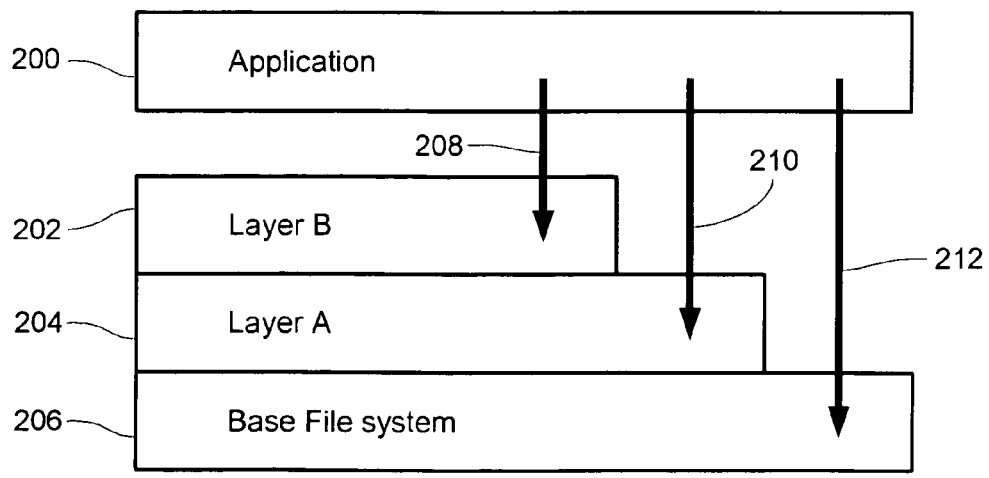
FIG. 2 illustrates the operation of a simple layered computing system.

FIG. 2 provides a simple illustration of layering system concepts. First in this example, an application 200 is running on a layered computing system, or simply a layering system. This application could be an application provided with an operating system, such as a file explorer or shell, or might be a third-party application installed later. This computing system contains a base file system 206, and two layers labeled "A" and "B", 204 and 202 respectively, which are enabled for accessing. A base file system is also maintained, which is the default file system (present even if other layers are not.) Base file system 206 will normally contain the fundamental portions of the operating system necessary to boot up and execute basic applications and functions. In this example layer B has general priority over layer A, which in turn has general priority over the base file system. A first file access 208 is made by application 200. The layered computing system determines the owner of the file being accessed. Finding an entry for file access 208 in layer B, the corresponding file in layer B is opened and returned to the application. The file access of 208 might also correspond to files in layers A or the base file system, however layer B is determined to be the owner as it has priority over layer A and the base.

Another file access 210 is made by application 200. The computing system does not, however, find a corresponding entry in layer B. An entry is found in layer A, which has priority over the base file system. Again, if a file existed in the base file system corresponding to the file access, the file reference in layer A would be accessed because layer A is found to be the owner with priority. The computing system is not able to find corresponding entries in layers A or B for file access 212, so that access is made to the base file system. Now this priority is merely exemplary; examples below will demonstrate priorities that vary between layers, applications and file types.

The contents of layers 202 and 204 can be presented or made inaccessible to the operating system by enabling and disabling the layer (the language below may also use the terms "activate" and "deactivate, but the operation is the same.) Thus the contents of a layer are organized in a single container that can be presented, withdrawn, moved or deleted as a unit. A layer that is enabled for access to the operating system overlays its contents to the base filesystem, and thus the layer contents appear to the operating system in their ordinary and expected locations. If a layer is disabled or removed, the layer contents no longer appear to the processes of the operating system, and thus a layer provides a convenient way to deposit or remove files from a computer as a higher-order unit.

For registry entries, these may be managed much like files. Registry entries, as in some operating systems, are maintained as a set for the operating system and generally consist of a name and a value. Each layer may contain a list of name/value pairs, the names being applied in priority as with file references and the value being either reported (for a read) or recorded (for a write or deletion.)

Application Layers

Certain of the systems disclosed herein relate to application layers, which are layers that contain the file objects and optionally registry entries of one or more applications. An application in this sense might be an application in the ordinary sense, such as a word processor and/or office suite, a browser, a game or the like, but can also include any software add-on to a basic operating system. Thus an application layer might include shells, system tools or even a service release for an operating system. A layer intending to isolate a host-installable application may have file references that reflect the application's file references as installed to the base filesystem of the base operating system. Thus the application's files, data and system accessible configuration can be presented as if they resided in their respective ordinary locations even though encapsulated in an application layer, with the appearance to a user that the application is installed in the ordinary fashion with the expected functionality.

In a system that provides for the enablement of several application layers, the application layers can be organized to separate or isolate several applications, which may provide certain benefits. First, the applications appearing to be installed to a computer can be modified by merely commanding enablement or disablement of the application layers. For example, an organization might choose to maintain computers with a particular operating system, with a different set of applications provided for individual users according to their needs. Thus the accountant would have the application layer containing the accounting software on his computer, and the graphics designer would have the graphics application suite layer on hers. Versions of applications may also be the basis of a layer. For example, an Internet browser version 1.0 might be encapsulated in an application layer on a user's computer. When version 1.1 of the browser is released, it can be captured to a layer, which layer is imported or deposited on the user computer. The layer containing version 1.1 is enabled, and the version containing 1.0 disabled and optionally removed from the user computer. Should, after use, version 1.1 prove too unstable for regular use, that layer can be disabled and the layer containing version 1.0 be re-enabled without undertaking any application installation activities. Of course, these principles apply to computers other than user computers, for example server computers or embedded systems.

The use of an application layering system as given above provides several additional advantages. If applications are stored individually in layers and if priority is given to an applications layer first, interactions between application files may no longer occur due to conflicting shared libraries (DLLs), as each application 'sees' only it's own installed libraries first. Libraries in the base operating system are seen next, those base libraries optionally preceded by libraries from other layers if desired.

By maintaining an application encapsulated in a layer, the application may become transportable from computer to computer. If the application layer contains the executables, libraries, configuration files and all necessary and/or dependent files for execution of an application, that layer may be deposited to any computer with an operating system compatible with the application. On a computer system that supports registries, an application layer may also contain registry entries or deletions. Thus if an application is captured to a layer on a first computer, the layer can be copied or located to a second computer while maintaining application functionality. As will be seen, a layer can provide a package that can be compressed, encrypted or transported conveniently. Thus, using a layering system application vendors can provide 'preinstalled' applications as layers on CD-ROM or other media, or as a download, those applications being pre-tested and guaranteed to work with a high reliability. A layer also provides a convenient container to limit access to an application, for example for time limited use or license key access.

The references of a layer may also contain file or registry deletions. Those are references that specify the absence of a file or registry setting, and thus the file or registry setting is shown to be deleted if the containing layer takes priority over another layer, or the base filesystem, that includes a corresponding registry entry or file.

Sublayers

Application layers may be composed of a single layer, containing the files and other content of the application, which layer may indicate that it is read-writable or read-only, allowing or preventing changes to the application layer. For a read-write layer, certain file writes can be directed to the layer determined, for example, by rules specifying sources (from particular application processes), destinations (directories), or file types. For a read-only layer, writes are directed past the layer to the next layer in priority.

In some layered systems, layers may contain sub-layers. A sub-layer is simply a layer that is joined to a parent layer, whereby the sublayer is configured to be enabled with the parent. Thus as the system receives a command to enable or disable a layer, its associated sublayers are also identified and enabled or disabled in tandem. The data of a sub-layer may be logically associated to its parent layer by including its information in the data of the parent, although a sub-layer can be stored apart if desired.

One use for sublayers is to separate a file portion that is an unchangeable "install" portion from a user configurable portion. For example, a word processor might by default include a set of executables, help files, configuration, links and other data. As the word processor is used, the user might be directed to enter his personal information including his name and address, and through using the application might change certain configurable items such as the tap stops, toolbars, and the default printer. In another example, a user might configure an email client with an email address, the address of an email server, and a password. These user configurations are usually stored by the applications to files, which are intended to be written in the base file system at some location.

An application layer can be configured with a read-only "install" portion that contains the base application with initial user configuration, and an empty read-write sublayer. As the user modifies the application configuration these changes to the file system are captured in the read-write sublayer. The layered computing system can detect that a write operation originates from an executable residing in the application layer, and record the write operation to the associated read-write sublayer thus storing any application configuration changes. This may be done by prioritizing the application layer and its associated sublayers specially relative to other enabled layers. An application read-write sublayer may also be prioritized before its application layer, so changes to application files, such as configuration files, can be seen by processes running on the system. This sublayer prioritization may be applied to the layers associated to a process as well as to application layers generally. If desired, the system may also discriminate files that are user files, for example documents or email attachments, that should reside elsewhere in the layered system heirarchy.

An advantage of pairing a read-only layer and a read-write sublayer in an application layer is easy restoration. To restore the application to its original installation state, it may only be necessary to erase or delete the read-write sublayer. For example, if the application were an email client, the user might be exposed to any number of viruses. Should the user mistakenly open an infected email attachment, the damaging changes that would have been made to the operating system are captured in the read-write sublayer. Upon discovering the infection, a manager application can receive a command to reset the application's read-write layer, which is then identified and the read-write sublayer can be wiped, for example by removing all the file objects therein. Thus the integrity of the base operating system may be preserved as well as other applications installed to the computing system Sublayers can also be attached to other sublayers. In the exemplary implementation a parent application is permitted to have one sublayer. The sublayer can specify a further sublayer, and thus an entire chain of sublayers can be defined through that method. But regardless of how sublayers are related to their parent layers, the sublayers of a parent are, in general, enabled at the same times the parent layer is enabled.

Conceptual Example

Figure 5:
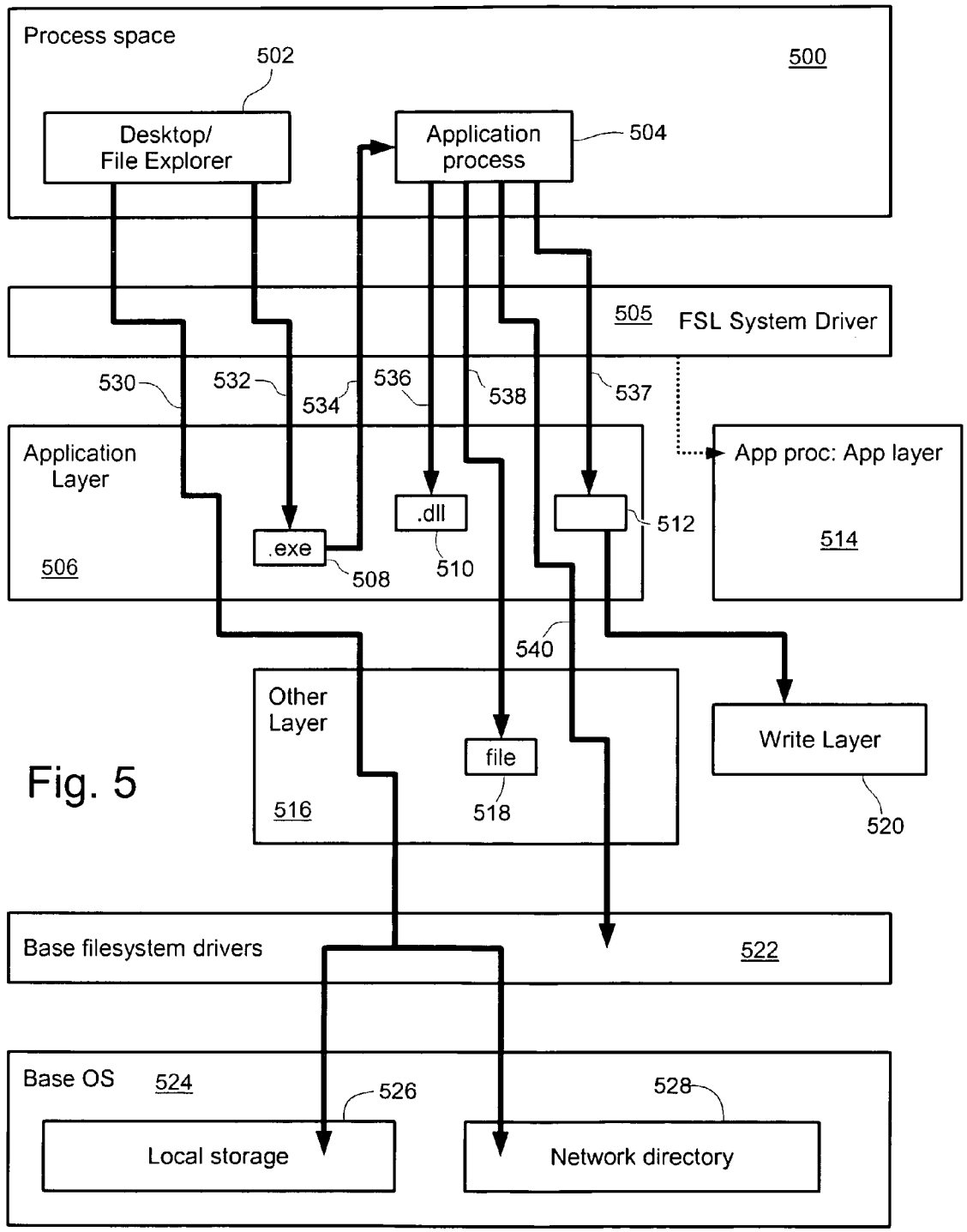
FIG. 5 conceptually shows the operation of an exemplary layered computing system supporting application layers.

The principles described above can be understood operationally, as depicted in FIG. 5. A base operating system (base OS) 524 provides facilities for interactions with files stored to local storage 526, which for example might be a hard disk drive, and optionally to a network directory 528, with those files generally being presented similarly as with files on local storage 526. Base OS 524 includes base filesystem drivers 522, which may be integral to the base OS or might be modular in nature, and provides file access to applications running under the base OS 524. A layered driver 505, in this case an FSL system driver as described below, is installed to provide access to layers as will presently be described. Further in this example, an application layer 506 is enabled for use by the system by way of driver 505 to provide access to files contained in the layer. Another layer 516 may also be enabled.

In the example of FIG. 5, a file explorer application 502 is provided with base OS 524. The file explorer may make requests for directory listings and for file accesses. In a first access 530, the desktop application requests access to a file reference by using the usual procedure calls. On installation, the layering driver 505 has modified the destination of those procedure calls so that it may process them prior to processing by the base OS drivers 522. First access 530 is first reviewed by the layering driver 505 by reviewing application layer 506 for the presence of a file entry matching to the access reference. For the first access, a match is not found and the access is permitted to progress. If other layer 516 is enabled, it is in turn searched for a matching file entry, in this example after application layer 506 due to the secondary priority placed to other layer 516. If after searching the enabled layers the layering system drivers 505 finds no entry matching the first access reference, the first access is permitted to follow the normal route of access through the base filesystem drivers 522, which may result in a file access in local storage 526 or network directory 528.

A second file access 532 is made from explorer 502, this time in the form of a command to execute a file, for example by a user double-clicking on an icon. For access 532 an executable file entry 508 is located in application layer 506. The locating of entry 508 results in a corresponding virtual reference, which is used to reference the data corresponding to the file entry. That data is loaded into RAM 534 and executed, resulting in a new application process 504. Layering drivers 505 notice that application process 504 is started from application layer 506, and make a relation 514 of that process to the layer from where it came, for example by referencing the PID of application process 504. The execution of application process 504 results in a request to load a library, which in turn results in a file access 536 for a "dll" file. Layering drivers 505, utilizing the relation 514 made earlier, detect that application process is related to application layer 506, and first looks for the file reference in the application's layer 506. The layering driver 505 finds an entry 510 for file access 536 in the application layer, the file entry 510 referencing a library specific to application process 504. That library is loaded into memory using the same procedure as the ordinary procedure provided by the base OS 524, with the exception that the read calls are redirected into layer 506 using a virtual reference.

Application process 504 makes a read request 538 for an additional file. No entry is found in related application layer 506. The layering drivers continue to search for a file entry corresponding to the reference in other layer 516, where a file entry 518 is found to match. The data of that entry is delivered to application process 504, even though the file entry is located in a different and lower-prioritized enabled layer. In a third file access 540 layering drivers 505 find no corresponding entry in enabled layers 506 and 516, and pass that access to the base filesystem drivers 522. A fourth file access 537 is an access to write to a file. In the example of FIG. 5, a write layer 520 is enabled to capture changes that would have been made to unprotected areas of accessible filesystems, for example the base operating system or a protected layer. Also in this example, application layer 506 is configured as a read-only layer and a file entry 512 exists in that layer for the write reference 537. Layering drivers 505 do not carry the write operation to file entry location 512, but rather create a new entry in write layer 520 for the written data, or modify a corresponding pre-existing entry in the write layer 520. Write layer 520 is prioritized over application layer 506 by the layering driver 505 to read modifications to a file reference first rather than the file data as originally created in the application layer.

Now in the example illustrated in FIG. 5, only references to files are discussed. References to a registry, for example a system registry, may be handled in a similar fashion to file references by substituting file objects for a registry reference and by substituting a filesystem for a registry object, for example an ".ini" or other registry file.

The above exemplary layered system is an example of a public layered system. In that type of layered system, applications not stored to a containing application layer may be given access to its contents. Thus processes such as explorer 502 can access the contents of application layer 506. In contrast, a "layered" system may be constructed with a private context. In that type of system, the contents of "layers" are made available only to a particular parent process, which might be a wrapper application that bootstraps drivers to intercept file accesses from processes started from a particular layer. Private context systems, however, do not permit applications generally to access the files within those "layers." A file explorer, for example, could not "see" into a private contextual layer either to execute an application or to access data files within. The contents of such a "layer" are thereby sandboxed and isolated from most if not all other applications on the computer. Additionally, because those layers are sandboxed from other layers, the stacking of layers is not possible; the choice of layers in a private context system is therefore simplified to relations between a wrapper application, it's child processes and the "layer" it is associated with.

A public context layered system, by contrast needs no wrapper applications to access and/or execute the contents of layers, as those contents appear to all applications generally (provided access to the layers is not restricted, for example by encryption). Additionally, several layers can be presented on the system at the same time to applications generally, which provides flexibility in the creation of layers and layered application frameworks. Most apparently to a user, the contents of a layer become immediately and generally accessible upon enablement of the layer without additional steps and complication.

Creation of Application Layers

There are many possible ways of creating an application layer. One method reflects the usual method of creating an application install program. The first step is to assemble all the application parts, for example by executing the necessary compilation and assemblage steps. The second step is to create a manifest of the parts. A final step is to insert the parts as manifested into a layer, becoming the application layer. This is much like the creation of an extractable installation file, except that an installation program for depositing files and adjusting installation paths for the application on the target system may not be necessary. That, and other manual methods, may be used. However, there are a number of automated methods that can observe an application installation and thereby create a corresponding application layer.

These automated methods utilize a "capture" operation, which from a conceptual standpoint observes the regular installation or de-installation of an application to discover which files belong to an application. A capture operation is generally started and ended, and uses the layering software to intercept operations that install, delete, rename or modify files and configuration such as a registry. If the layering system supports layers having both a readable and read-writable portion, the capture operation may record changes to the read-only portion, which becomes effectively locked when the capture operation is ended. During the capture operation changes made by the installation procedure do not affect the base system, but are rather recorded to the new layer.

A first layer creation mode is simply called "capture" mode. When that mode is enabled, all operations by any application to create, modify or delete files are entered into a layer. This mode is especially helpful in situations where it is desirable to create a new layer for one or more applications to be installed to the computing system. In an example of a capture mode operation on a Windows platform, a user first enables capture mode. The user then executes an application installation program. During the install, all of the applications shared DLLs, registry entries, and .ini files that would be directed to the Windows system directories become trapped in the capture layer. Application files that would be placed on file systems managed by the OS are also redirected into the layer. All of the captured data is held separate from the regular OS either locally or remotely in a new layer, a data file, hard disk partition, or some other container.

A second layer creation mode is referred to as "capture by PID" mode. That mode is similar to "capture" mode, with the difference being that only changes made by a particular process ID (PID) or one of its child PIDs are captured.

A third layer creation mode is called "delete capture" mode. This mode may be thought of as the inverse of "capture" mode. Delete capture mode is intended to track all of the file system and registry deletions that occur and place those files and registry entries into a new layer. The software (driver) is hooked into the system so that operations that delete, rename, or modify file system or registry so they can be copied to the capture layer before they are modified. This mode may be particularly helpful to create a layer of an already installed application. The user enters "delete capture" mode, following which the user activates the application's deinstallation program. As the application's uninstall program removes files and registry settings, they are copied to the new layer. When the uninstall is complete, the user exists delete capture mode. At that time the application does not exist in the regular file system or registry, but can be activated by the user as it appeared before the uninstall operation by activating the newly created layer.

A fourth layer creation mode is called "delete capture PID" mode. That mode operates in similar fashion to delete capture mode, with the difference that only changes made by a particular PID and child PIDs are tracked, rather than system-wide changes.

The tracking of file and registry writes may be performed generally or with reference to a parent process, as will become apparent from the disclosure below. Finally, after a capture operation a layer may be added to or files removed from the set of captured objects manually, should adjustments need to be made.

Architecture

A computing system supporting layers may be configured as conceptually depicted in FIG. 1. A base operating system 110 forms a platform with which applications can be run and files can be accessed in file systems. Base operating system 110 further has registry settings, globally available to applications for reading and writing. The system has libraries 108 for executing the functions of the operating system including operating file systems and registries, and other operating system functions. Tied into libraries 108 are layering system libraries and/or software 106 which intercept file system and registry accesses from applications 104. As accesses are received from applications 104, the layering system software 106 performs computations to determine whether the accesses should be permitted to continue to the base operating system 110, or should be redirected to layer information 112, the information relating to the contents of file objects and registry settings. A layer manager application 100 may be provided to permit control and configuration of the layering system software 106 through a management API and library 102.

Figure 4:
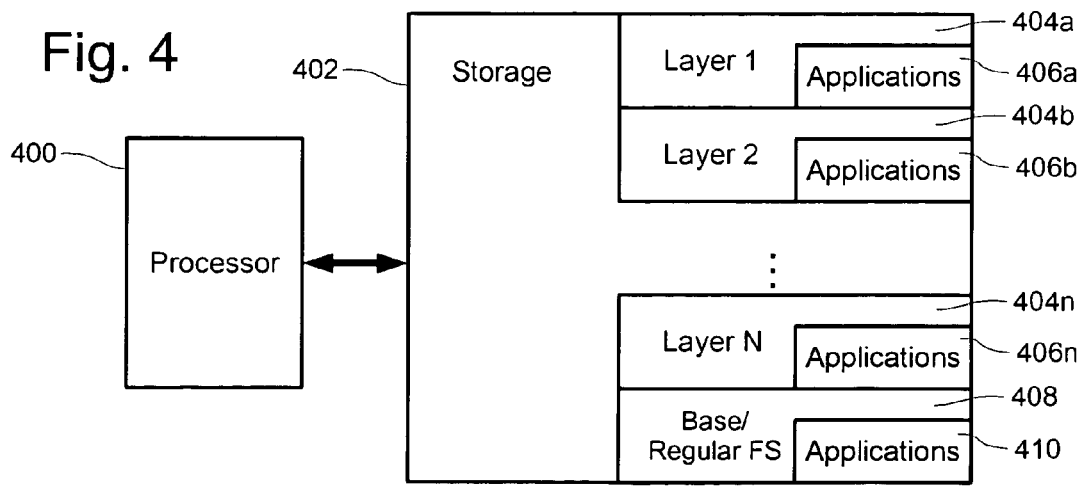
FIG. 4 conceptually illustrates one storage organization for a layered computing system.

A layer may take many forms, but in essence, a layer is a container of file objects and/or registry settings, accompanied by the names and paths to those objects when overlaid on the regular file and/or registry systems. For applications that do not utilize a registry, an application layer and system need not contain or support registry settings. Layers may be stored to a storage device 402 as shown in FIG. 4, which might be a hard drive or other local storage. Although it is convenient to store a layer to a local non-volatile storage medium for long-term availability, a layer can also be stored to memory, a network or other location if desired. The computing device of FIG. 4 includes a processor 400, which may also have peripheral devices attached such as memory, input devices or output devices as desired, and interacts with one or more storage devices 402 thereby providing storage for the processor. On storage 402 is a base operating system 408 and applications 410. A number of layers 404a-n are also contained on storage 402, each having applications 406a-n. These layers may be stored in a block as a single file, as a block of sectors on the hard disk, in a directory structure on a regular or base filesystem (as will be discussed below), or in any other convenient form. For example, files and registry settings may be stored in a regular file system, where the file paths are stored under a directory and in a directory structure that mirrors the file object locations in the regular file system. Such a mirrored layer system may be organized in a common directory, with one subdirectory per defined layer, each containing a mirrored directory structure of the underlying file system. For systems that utilize a mirror structure of an underlying file system, it may be desirable to hide the mirror structure from applications, except perhaps a manager application, so as to prevent accidental data modification, loss, or meddling. A layer definition may include layer properties, flags and settings, layer inclusive files, references to those files, registry settings and locations, and a manifest or directory those file and registry references.

A layer may be packaged in a form transportable from an individual computer, which packaging is referred to here as exporting a layer, which produces an exported layer. An exported layer contains the information contained in the original layer, but is packaged into a transportable form, for example in a single file that can be managed, copied, downloaded or recorded and moved. For example, an exported layer may utilize an archival format, such as a zip or tar format. Additionally, dependent sublayers (described below) may also be packaged with the exported layer for convenient management.

Variablization

It can be advantageous to generalize, or variablize, pathnames in a layered system. Some operating system types permit certain system and user directories to be renamed or located in various locations, which can impede the portability of a layer. Variablization provides a way to generalize a layer and make it operable in the face of variations of these directories.

It may optionally be desired to include variable handling with regard to file system paths and registry paths. The location of a file or registry setting specified in a layer may include one or more variables, so as to permit relocation of that object. A variable may be denoted in many ways, for example by surrounding the variable name with percent "%" characters. The source of some variable names and values may be from the environment. For example, Windows operating systems set the "WINDIR" environment variable to the location of the OS system subtree, for example C:\windows. Including the WINDIR variable in a path may permit files of a layer to be moved from one Windows system to another, especially if the OS system subtree resides in different locations on the computers. Other variable values may be supplied at runtime, for example a "CURRENTUSER" variable. In that example, the CURRENTUSER variable is set to a user's login name while that user is logged in. One use of the CURRENTUSER variable is to provide a layered file reference for a global file that appears in each user's profile directory. Yet other variable names and values may be stored in a layer definition. A manager application may provide editing facilities for changing those layer-defined variables, and for editing the pathnames of virtual files.

Figure 8:
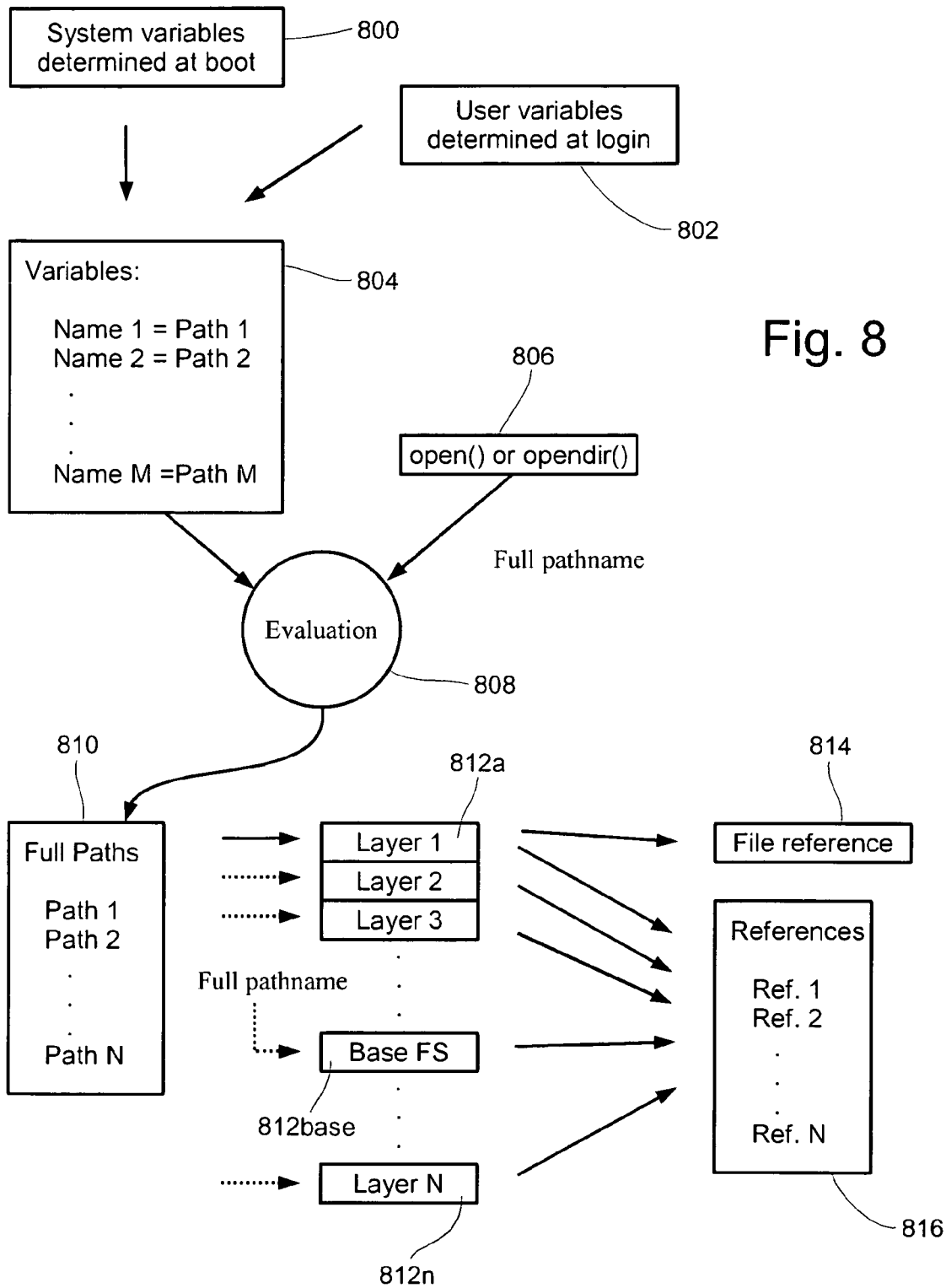
FIG. 8 provides a visual description of one application of variablized paths in a layered system FIG. 9 visually depicts a process of associating child processes to layers.

FIG. 8 provides a visual description of one application of variablized paths in a layered system. First, certain variables are determined at boot time 800 and maintained afterward, such as those pertaining to the operation of the system, for example a system directory of which a "WINDIR" variable may be appropriate. Other variables are defined when a user logs in or is otherwise identified 802, such as the "CURRENTUSER" variable or a variable to a user directory such as the user's profile directory named "USERPROFILE". Other variables might be defined at other times, as desired. The result is a set of M variables 804 that may be applied for accesses to a filesystem or registry. In a multi-user system, each user may have a list 804 that corresponds to her user settings, and in that system each file or registry access is preceded by an identification of the user assigned to an access-requesting process. As open requests, and other file or registry requests, containing a named or path reference are received 806, those references are expanded to their full long pathnames. A path reference might be a path to a file or a directory, or other filesystem path. Those full representations are then evaluated 808 against the set of variables, and where a variable setting can be found in the full pathname. The result of evaluation 808 is a set of N paths containing variables as described above, and the original full pathname.

In the example, a number of layers 812a to 812n are enabled in the layered system. The contents of each layer are compared against variablized paths 810 for a match. If the original request 806 was an open, or other operation reporting a single file, the comparisons continue until a match is found and a file reference 814 is produced therefrom. For requested operations 806 that report multiple files, a set of matches 816 is constructed from the comparisons, which may be returned through ordinary file operation functions. As the layers are traversed, a base filesystem 812 base may be encountered. In that case, only the full pathname is compared, as variables are not applied to references outside the layers.

Variablization may also be extended to registry values. If a registry value is retrieved from a layer in response to a request, the variable entries in the layer representation are replaced by their variable values in the system at the time of the request. For setting variablized registry entries to layers, that may be conducted as for a file write operation search, and also detecting a request to set a registry entry coupled with a determination that the setting is destined for a layer. Following that, the value of the registry setting is examined for a variable setting contained within, identifying a variable that has a path value included in the value to be set in the registry entry. In the exemplary system below, if two variables may be applied, the variable with the longest value (most directory steps) is chosen for the substitution. The value of the applicable variable is substituted into the value to be set, and the substituted value is recorded in the destination layer as a registry entry.

The setting of file references and registry values follows the evaluation 808, however it may be helpful to store only one variablized representation rather than the several of list 810. The selection of representations is made, for example, by using the longest variable representation as described below for the exemplary implementation.

Priority Schemes

Many possible priority schemes can be used with a layering system, and certain of those schemes are conducive to use with application layers. In a first scheme, application layers are simply overlaid over the base filesystem, either with a general higher or lower priority. Where files are duplicated between an application layer and the base, for example a .dll library, the file provided by the application layer will take precedence in a system prioritizing application layers more highly. Alternatively, a lower application layer priority will permit base files to override application files. Either can provide advantages and disadvantages; the advantage of preferring application layers provides for use of updated libraries and system files by inclusion in the application layer. On the other hand, preferring the base ensures use of known files which may assist stability and debugging. But in either case, should the non-preferred layer contain an updated file it will be overridden by the system in this simple scheme.

One solution to this problem is to include additional layer types. Not only could a layering system include application layers, but also patch layers. Thus a layering system might give higher priority to application layers, but an even higher priority to system patch layers. Thus an updated system library could be delivered in a patch layer, which would override any corresponding libraries located in application layers. Thus a layered system may rank layers identified as one type over other layers identified by another type. This concept can be extended to include patches of patches, and so forth, which layers may optionally be provided with a priority setting.

Those schemes are useful in prioritizing files provided by an application or operating system provider. Other schemes are useful to prioritize user written files. A first method is simply to permit user writes to be recorded in a base filesystem. This provides a minimal application layer system, but does not protect the system against malicious or accidental damage.

An improvement can be made by providing a writable layer that captures files written generally. This layer might be global to the entire computing system, or instead a writable layer might be made for each user. It may be necessary in those schemes to discriminate between writes made by applications and other writes made by system processes so as not to impede system operation.

A prioritization by layer type may be structured in many ways, but generally certain layer types may take priority over other layer types. For example, user layers may take priority over a base filesystem to capture writes made by user applications. Likewise, it may be desirable to prioritize user layers over application layers to prevent user modifications to application-related files. Application patch layers may take priority over ordinary application layers to overwrite old files to be patched. Likewise, system patch layers may take priority over a base filesystem. A security patch intending to fix an exploit may likewise take priority over both base filesystems and application layers.

A significant improvement can be made to a layering system supporting application layers by tracking processes against the application layers that they spring from. In such a system the layered system drivers, or another component, maintain a relationship between process identifications and application layer unique names. The association can be made, for example, when an executable is started from an application layer. That system then operates under the presumption that requested files will be first intended to be found in the application layer, followed by other layers or the base. That system can make a further presumption that file write operations from an associated process should be associated with the application layer in a read-write sublayer or other location. Exceptions to those presumptions can be made, some of which are discussed below.

Referring now to FIG. 11, one such method of prioritizing layers is conceptually depicted. The method begins by an open function call 1100, or another function to access a file object or perform a file operation. If the calling process is related to an application layer, it is identified 1102. Variablization 1104 may also be performed. After layer identification, the method branches 1106 to one of two search methods. If the process is not related to an application layer, a normal priority search 1110 is performed, with general prioritization. Otherwise, a search is performed that favors the prioritization of the processes application layer 1108, which may have the effect of specially prioritizing file accesses to the application layer to which a process is associated or related. This special prioritization may prioritize the related application layer over other enabled layers. Any file object found or created in the appropriate search is returned 1112.

This method may also be applied to registry settings, which method is initiated by a request from an application a to perform a registry operation. The process originating the request is identified, and if the process is associated to a layer, that layer is prioritized specially relative to other enabled layers. A search of registry objects is then performed looking for an object corresponding to a registry key of the request, using the determined priority. The results of the search are much the same as for file objects, but registry key values or references to registry objects may be accessed or returned instead.

In a related method depicted in FIG. 12, a close request 1200 may generate activity in the layered system. The open request may generate a file reference object, which may contain information about the filename, the position of the pointer in the file, permissions, and other information. This object is released 1202 when the file is closed, and the closing function may report the success or failure of the close operation 1204.

In the case that a process is associated with an application layer, the priorities of evaluation of enabled layers can be advantageously modified. For reads, a layered system can prioritize the application layer higher than other layers, and increase reliability. By doing so, it can be ensured that the application's libraries and other files will be considered first before other libraries located to the base or other layers of unknown versions and origins. Likewise, an application layer related to a process that performs a write operation can be prioritized higher to ensure that those writes are retained with the application layer. This association is good and logical when used in connection with, for example, configuration related to the application. The writing of user files apart from an application layer will be addressed below.

It is possible for the system to maintain more than one priority for an application layer. This can be used, for example, to cause writes of user files to appear in a layer other than the application's layer. For example, the application layer might be prioritized highly for reads, thus ensuring use of the libraries, configuration and other files supplied with the application. But for writes, the application layer gets a lower priority than another writable layer (or the base filesystem), ensuring that user files remain accessible even if the application layer is disabled or removed from the system.

Different priorities can also be assigned for different types of accesses or activities. One example of this provides an improvement to the automatic execution of applications based on a file type. In modem graphical operating systems, a user can 'launch' a file rather than an application by double-clicking the application. For example, if a user double-clicks on a .htm file, the default web browser on the system will be started with the file as an argument. A layered system can assign a different priority to lookups for this activity.

In a Windows operating system, associations of file types to applications is by HKCR registry entries. Thus a file explorer application looks to these registry entries to see which application should be started if a file is double-clicked on. These registry entries can be provided in an application layer, and thus when such a layer is installed and enabled the application is used to open its assigned file types. But a question, however, arises if two applications are installed which can open a common file type. For example, most word processors can open a plain text file. Many operating systems include a simple text editor that can also open such a file. Without the assignment of priority between the application layers, one may take priority over the other at random, or due to some artifact of priority evaluation in the computing system.

In an alternative priority scheme, each application layer is assigned a priority for its file type associations. When the file type associations are accessed (which may be HKCR registry entries) the application layers are examined in order of that priority for a matching file type association. In this way, a layered system designer can control the set of preferred applications to open or process certain file types, and by assigning a priority for each application layer control the preference among them. In a variation on this alternative, each file association can be assigned a priority, making possible different priorities for associations in an application layer, permitting one application to be preferred for one type and another application to be preferred for a second. This scheme can also be extended for operations other than opening files, for example selecting a preferred backup or compression program based on a file type.

Figure 7:
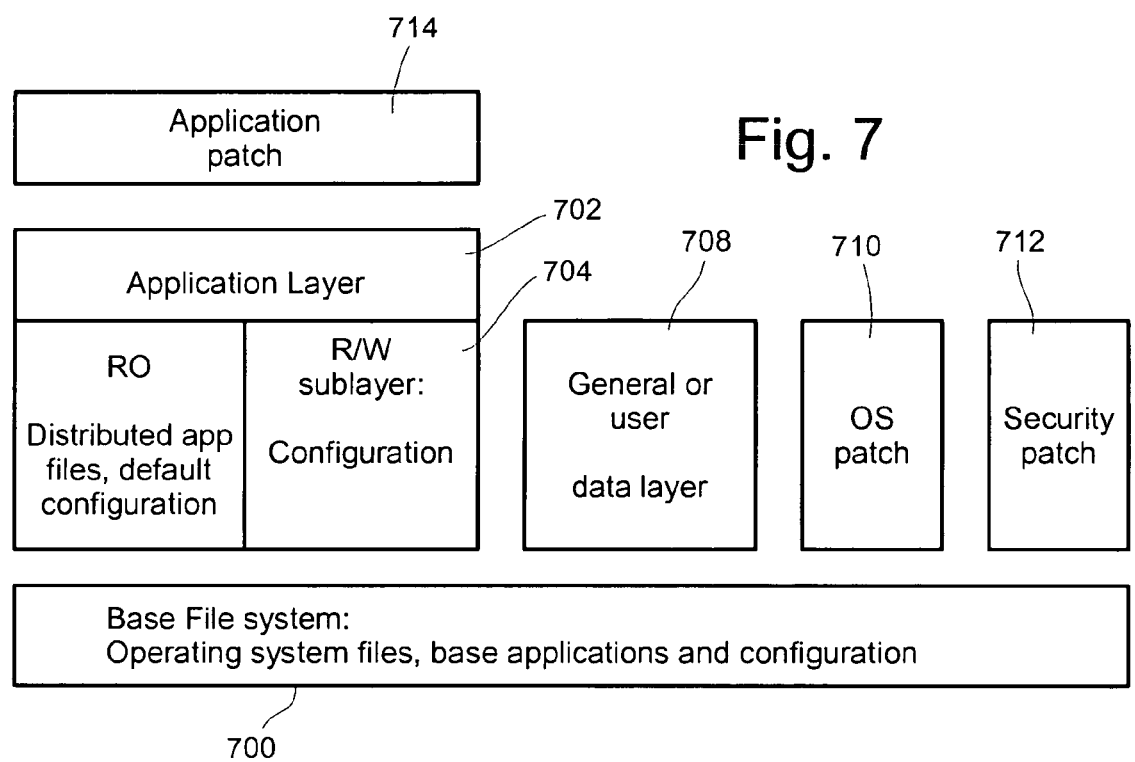
FIG. 7 conceptually illustrates priorities in an exemplary layer-typed layered computing system.

The concepts mentioned above can be brought together in a single layering system to provide tailored operation for particular needs. Illustrated in FIG. 7 is one such system. The layering scheme of FIG. 7 is based on an ordinary operating system, which includes a base file system 700 used by the operating system by default. Base file system 700 includes the necessary files to bootstrap the operating system and undertake ordinary operating system actions and activities. Base file system 700 may simply reflect a common operating system installation to an ordinary computing device. The scheme of FIG. 7 prioritizes application layers and other layers installed to the computing system conceptually as shown, with vertical relationships generally reflecting a layer dependency.

In the example of FIG. 7, an application layer 702 is installed to the computing system Application layer 702 is configured as read-only, and contains the application files that would be installed to the base file system 700, but captured to the layer, such as the executables, help files, configuration, libraries and other application files. Application layer further includes a read-write sublayer 704 associated to layer 702, which may store changes to the application configuration, add-ons and other files. A data layer 708 is a read-write layer used to store user files generally or for a particular user. The other layers are configured read-only to prevent inadvertent or malicious changes. Layer 710 contains a patch to the operating system. The files included in layer 710 might be updated libraries and system applications with additional functionality. It might also encapsulate a service pack or update, providing updated operating system files with a number of problem fixes. Security patch layer 712 contains a security patch, which may be only an updated version of a single operating system file to fix a hole or exploit existing in a prior version. Also incorporated to the computing system is an application patch 714, which provides updated or fixed versions of files located to application layer 702 in either the read-only portion or the read-write sublayer.

In the priority scheme of FIG. 7, all the layers are identified by one of the types shown, for example by a fixed label included with the layer. The layered computing system identifies the layers by their types, and applies the priority scheme in automated fashion. First, consider the priority for read operations. The layers with highest read priority in this example are the security patches, such as layer 712. This is advantageous to system administrators because if the layer is present on a computing system, the security fixes contained therein are sure to overwrite any flawed files an attacker might use to gain control of the system. The next priority for reads is the application patch layer 714. Patch layer 714 must be considered before application layer 702 to override any older files distributed in that layer. Patch layer 714 may also override read-write sublayer 704, although care may be needed not to override any local configuration stored thereto. The read/write sublayer 704 gets next highest priority to ensure that any local configuration written thereto overrides the default configuration stored to the read-only layer 702. The application layer 702 is prioritized over the base file system 700 and any operating system patch layers 710 to ensure that an application can override the default behavior of the operating system, for example to place an icon on the desktop or to provide a shared library that is newer or provides more functions than the default. Of course, any operating system patch layer 710 precedes the base file system to override older files. Read-writable data layer 708 can be prioritized in many ways into this scheme, generally in accordance with the control the user is to be given over the computing system. For example, data layer might be prioritized just above the base file system 700 to preserve the base file system in a pristine state that can be reverted back. Such a data layer may provide for simplified backups of user data, as the backup program (which could merely be an export of the data layer) need only backup the contents of the layer. A data layer might be prioritized last for writes, as a catch-basin for miscellaneous files not landing in another layer or the base. If a user is a developer, it may be desirable to have a data layer that overrides all other layers so new files can be tested without re-building existing layers.

In the scheme of FIG. 7, an application layer can be prioritized higher than other application layers if a read or write request originates from a process executing from that layer, if desired. It can also be seen that the priority in that scheme differs between reads and writes, particularly for data layer 708. Now the priority scheme described and illustrated for FIG. 7 is not the only or the best priority scheme possible, but is merely one conceptual example.

For example, in other schemes a base filesystem may be treated as a layer. Thus if a process is not related to an application layer, the system may attribute that process to the base filesystem "layer". In that case, libraries and other files in the base filesystem may take priority over others contained in application layers or elsewhere.

Layer Specified Priorities

In the above examples, the layered computing system determines priority from the identity of the enabled layers. Thus, each layer carries an identifier of some sort useful to the layered system drivers to discriminate between layer types. In alternate schemes, a layer may specify where it fits in the priority scheme.

In one example, a layer may carry information that instructs the layered system to prioritize the layer before (or after) other identified layers or base filesystems. Thus an operating system patch may instruct to be installed above the base filesystem, but below other application layers.

In an alternative, layers can carry priority values or weights relative to other layers, or base filesystem(s). In one example, values are represented as floating point values between 1.0 and 100.0, where lower numbers are higher priority. As new layers are defined, these can be prioritized between other layers. So in a system where a security update carries a priority of 30.0, and an application layer of version 1.0 of an application carries a priority of 50.0, an application layer containing version 2.0 of the application might be prioritized anywhere between 30.000 . . . 1 and 49.999 . . . . The exemplary implementation below is such a system, and the use of values assigned to layers will become more apparent from the description below.

A weight may be identified for each enabled layer, which determines the priority of searches for objects in the enabled layers. A default weight may be applied to a layer, depending on the layer type. A layer may also specify weights relative to a base filesystem or to other layers. More than one set of weights may be used for searches of differing types. In some layered systems, accesses to file type associations, for example contained in a registry, may take on a special priority. In one example, in a system that has file type associations to applications, a second set of weights may be used to provide for associative priorities between applications handling the same files, where those priorities may differ from ordinary file accesses. The file type association or registry setting appropriate to that differing priority is returned or accessed. A layer may carry other additional weights, for example a weight to be applied to a layer associated to a requesting process, or a different weight for a write operation. Thus a default weight may be applied, overridden by weights for associated processes, file type association requests or other factors, thus applying a different layer prioritization to the layers as a whole for requests from different processes or under special circumstances.

Exclusions and Inclusions

In one preferred system, layering only applies to files located to fixed disks and network drives, each layer spanning one or more fixed disks. In that system removable disks should not generally be layered, as a layer generally pertains to the persistent files and configuration required to operate an application or user environment. It is expected that under most circumstances user files should be permitted to be saved to a floppy disk or CD-RW, for example, so a user can transport his data files to another computer. Likewise, areas on a fixed disk may also be reserved for user or other files to be excluded from layering, for example a "my documents" directory, as desired.

One way of achieving this is through the use of layers that carry file reference information, specifying what files may (or may not) be written thereto. Thus, as a write request is received, the file reference of the request is compared against the file layer information which determines whether the write operation is directed to that layer. The file reference information may take the form of inclusion or exclusion entries. Exclusion entries specify files and paths that are disallowed to be found in a layer, while inclusion entries are the opposite. Exclusion or inclusion entries may be defined for a file type, or for a directory or path.

Exclusion entries define file types or paths that may not be written to a layer. When applied to an application layer, exclusion entries may provide control for the application provider as to what will land in (be written to) the layer. For example, it may be that the application layer provider wishes to capture only certain file types corresponding to configuration, but not to user files, in order to ensure that the application layer does not need to be backed up, or to ensure that the application layer provider is not responsible for user data loss. This may be done by entering exclusion entries in the application layer information for the user file types and directories. Inclusion entries may also be used, which entries indicate file types and paths that are to land in the layer. So in the example, inclusion entries might permit application configuration file types and the application's installation directory.

Inclusion and exclusion entries may also be used with data or user layers, which may be configured to capture user file writes that would otherwise land on a base filesystem or in another layer. Data and user layers may also be prioritized accordingly to make effective their exclusion or inclusion entries. For example, a data layer containing inclusion or exclusion entries may be prioritized before any read-write application layers or sublayers to capture the specified files, avoiding deposition into the application layers. Alternatively, an application layer may contain inclusion or exclusion entries, and when coupled with a lower-prioritized data layer permits certain files to be written to the application layer while preventing other writes from landing on a base filesystem.

Automated Enablement/Disablement

Some systems may provide a multi-user environment providing a facility for an administrator to designate layers accessible to individual users and another facility to automatically enable layers on user login and disable layers after a user has logged off. In those systems an administrator may provide layers accessible to all users or some users. Other layers may be provided accessible only to an individual user. In a subset of those systems a writable layer is provided for each user, providing data protection and isolation between users.

It may also be desirable to provide a startup layer enablement function, whereby the computing system starts up a group of layers based on layer configuration. This will be especially helpful where it is desired not to provide users with non-layered access to the underlying file system and registry, for example in public settings.

Process and File Operation Handling

In a layered computing system supporting application layers, it can be desirable to relate processes to application layers. In the example of FIG. 7 processes were related to application layers to determine priority between layers. It may also be useful to track processes for permissions to access layers or the base filesystem, for example in a secure layered system. It is therefore worth considering a process lifespan in the layered computing system.

A multitasking computing system maintains a number of tasks running at the same time, which are referred to as processes. Relatedly, a single process can develop several sub-tasks which are sometimes referred to as threads. In the systems discussed here, processes are the tasks tracked by the operating system, thus permitting differing treatment for file accesses between them. A system discriminating between threads is conceivable, given appropriate inter-process or inter-kernel communication.

In modern operating systems, the computer is booted into a master process which exists until the system is shut down. As the system boots, new processes are created to handle the numerous tasks handled, which are as diverse as email handling to handling timer events. One of these processes is a shell or graphical user interface providing reception of user input. As a user logs in, new processes are created for the user which may be run with a restricted permissions set. As a user double-clicks on icons or selects menu options, new applications can be started, which applications run by the execution of one or more processes.

At the most basic level, a new process is started using a "fork" procedure. The reason it is called a fork is because one process is turned into two, which are the parent process and the child process. When a process is complete, it "terminates" and the operating system ceases to multitask time to it and releases its memory. Further description of the intricacies of process creation and termination will not be necessary to one of ordinary skill in the art for the remainder of this discussion.

One technique of process tracking involves watching the forks and terminates on a computing system. This can be done by inserting custom fork and "kill" or "signal" functions, for example by vector redirection. Now turning to FIG. 9, a fork process is illustrated that is capable of creating associations between processes and layers. A fork request 900 is made from an existing process, for example by calling fork( ) or by another method effective to request creation of a child process. At this point, a new process is created 901, and the new child process is assigned a new process ID (or PID) which appears to the kernel's process management data structures. In the course of creating a new process 901, the parent process will return from the fork( ) call, typically with the process ID of the new child. The remaining steps shown are performed by or for the child process rather than the parent.

Next, the method attempts 902 to identify any application layer associated with the parent process. If an application layer is identified 904, the method proceeds to relate the child process to the parent's application layer. In the method shown, an exception 906 is permitted to avoid this assignment. This is useful, for example, where the system can determine that the process being created is a system process, or a process that should execute from a different application layer. If there is no exception, the child process may be associated to the parent's application layer 908. If there is an exception, the method considers whether another layer should be assigned in step 912.

Referring back to step 904, if a layer is not associated with the parent process, the method considers an exception in step 910. This exception is triggered where the system can determine that an association is appropriate. For example, the fork request may originate from an exec( ) call (discussed below) and may be executing a file within an application layer. If there is an exception, the child process is assigned 914 to a layer as appropriate. If an exception occurs in steps 906 or 910, the process considers 912 whether the new process should be assigned to a layer. This might be appropriate where a system is being run in a secure mode, where all new processes are assigned to some layer to capture writes, such as an intrusion protected layered system, or in a system that requires assignment of a layer for all processes. If a layer is to be assigned, that is done in step 914, which may optionally create a new layer if necessary. If no layer association is determined otherwise, the child process remains unassigned in step 916. Finally, the child process is permitted to return from the fork( ) call and begin process-space execution.

Figure 9:
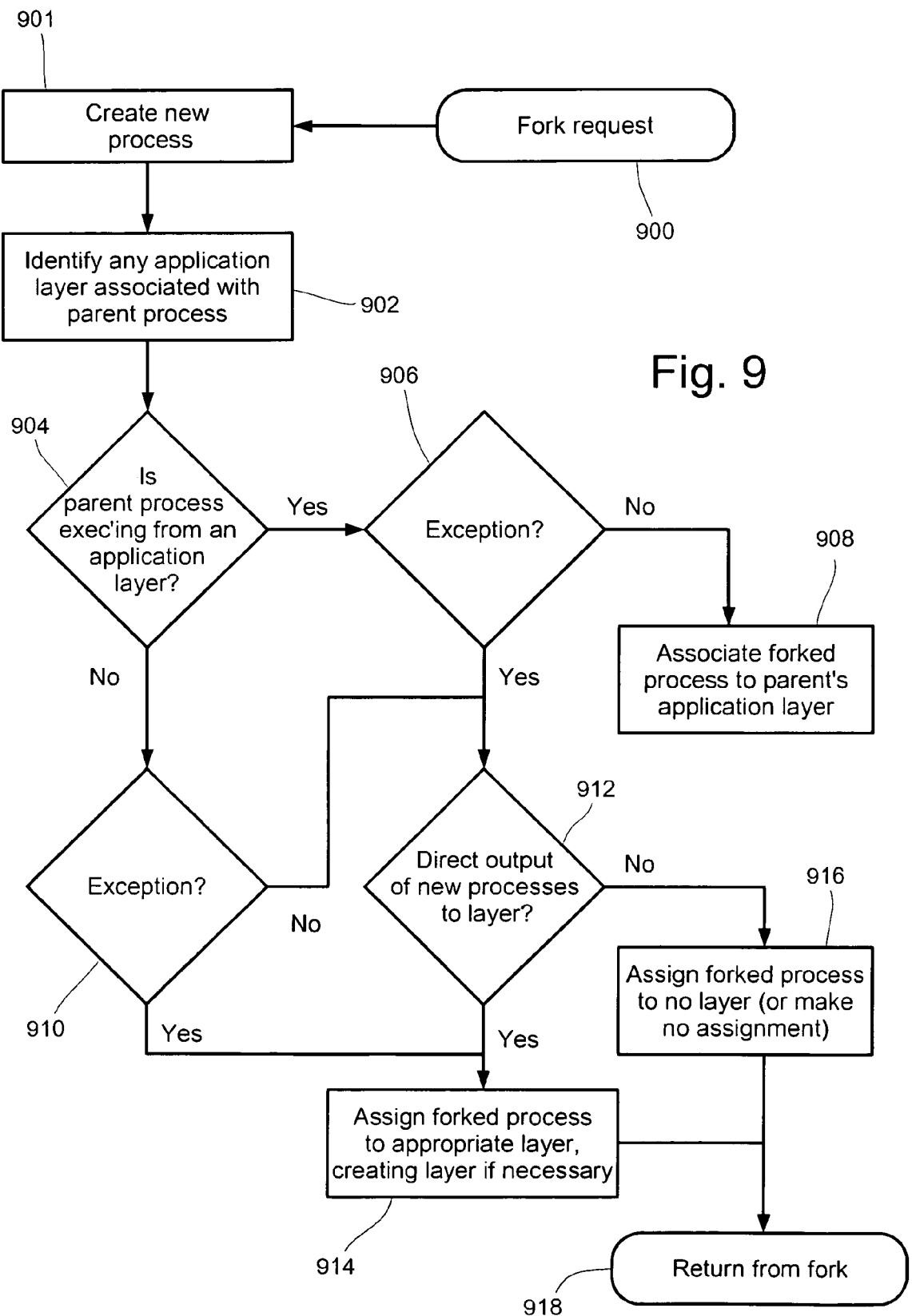

Now it is to be understood that processes can be reassigned as they are running, and the associations determined in the method of FIG. 9 or at process creation need not be permanent. In an alternate method, the exceptions determined in steps 906, 910 or 912 can be made after observing the behavior of the child process. For example, if the process opens a file type permitted only by system processes, it may be appropriate to remove the assignment to an application layer (or associate the process with the base filesystem(s).) In the exemplary implementation described below, an association is made to a system installation process if access of an installation file is made. Alternatively, if a process attempts to write to system directories in a suspicious manner, a new read-write layer can be created for the process and an association made.

In one example of exception handling, a layered system may be made to recognize installation processes that attempt to install files that are part of an application contained in an application layer. Some applications permit parts to be installed at run-time. These include browsers that install plug-ins, or applications that check for and install application updates. Some operating systems provide a system installation service usable by applications through inter-process communication commanding certain installation actions. This service process may not be associated to any layer, and thus if it performs installation activities for an application those installation parts may not be recorded in the appropriate application layer.

In the course of installation, a file of the application may be accessed to obtain installation configuration. In the example, as a file is opened within a layer, a determination is made as to whether the requesting process is an installer process. If so, that process is associated to the layer to which the file open request is found in. A determination may be made, in some cases, through a recognition that a file is being opened that is an installer file. An installer file, for example, might have a particular name or extension. Another method examines the requesting process, and recognizes it as an installation process if it was executed from an installer executable. This may be done, for example, by comparing the name of the executable against known installer executable filenames. Of course, both may also be used. In some systems, the installer process will keep the installer configuration file open during the install process. In that case, the installer process may be released from the association to the application layer at the time the installer file is closed.

A companion function to the fork function is the exec function. The exec function is called with an argument of a file to be executed in the creation of a new process. The process shown for FIG. 9 can be applied more specifically to an exec call. For example, in determining an exception 910, the filename passed to exec can be opened, and in the process of performing a priority search the containing layer can be identified. This may be done by detecting requests to open and execute a file object, creating a new process, and associating the process with the layer in which the file object is found, if any. Thus applications executed from other application layers can take on the priorities of the application layer in which they reside. On the other hand, in determining an exception 906 or 912, the pathname passed to exec can be reviewed for special treatment for certain filename extensions or directories. Alternatively, the new process may be associated with a layer associated to the requesting process.

Now regardless of whether in a particular operating system functions named fork and exec exist, all multitasking operating systems will carry equivalent functions for creating new processes as described above; this disclosure is inclusive of any such operating systems, and those equivalent functions are included within the meaning of fork and exec.

Tracking of processes may be as simple as a table containing entries for each associated process in combination with a unique layer identifier for each. For simple priority schemes, this can be expected to work sufficiently well. For more sophisticated priority schemes, it may be desirable to build a record local to a layered driver containing priority information for each process, alleviating overhead processing that might be encountered for processes that frequently access files. Overhead may not be significant, however, because priority searches need be done only as files are opened, which is a relatively infrequent event in many computing systems.

In the case where processes are tracked in a table as described above without a local record, closing a file results in merely removing the process entry from the table. If a local record is kept, a process may be used as depicted in FIG. 10. As a process is terminated 1000, the process first determines whether the terminating process is assigned to a layer 1002. This may be done by reviewing the tables, records, or other data structures maintained for process association tracking. If the process is assigned to a layer, the layer is disassociated from the process 1004. In the method of FIG. 10, local association structures may be shared between processes, as the priorities between processes associated with the same application layer may be the same. A further determination is made in step 1006 as to whether other processes are associated to the layer the terminating process was associated to, and if not, the priority record is released from memory 1008. If other processes are associated to that layer, the layer priority record is preserved. Finally, the process is terminated and any records for that process are released 1010.

Figure 6:
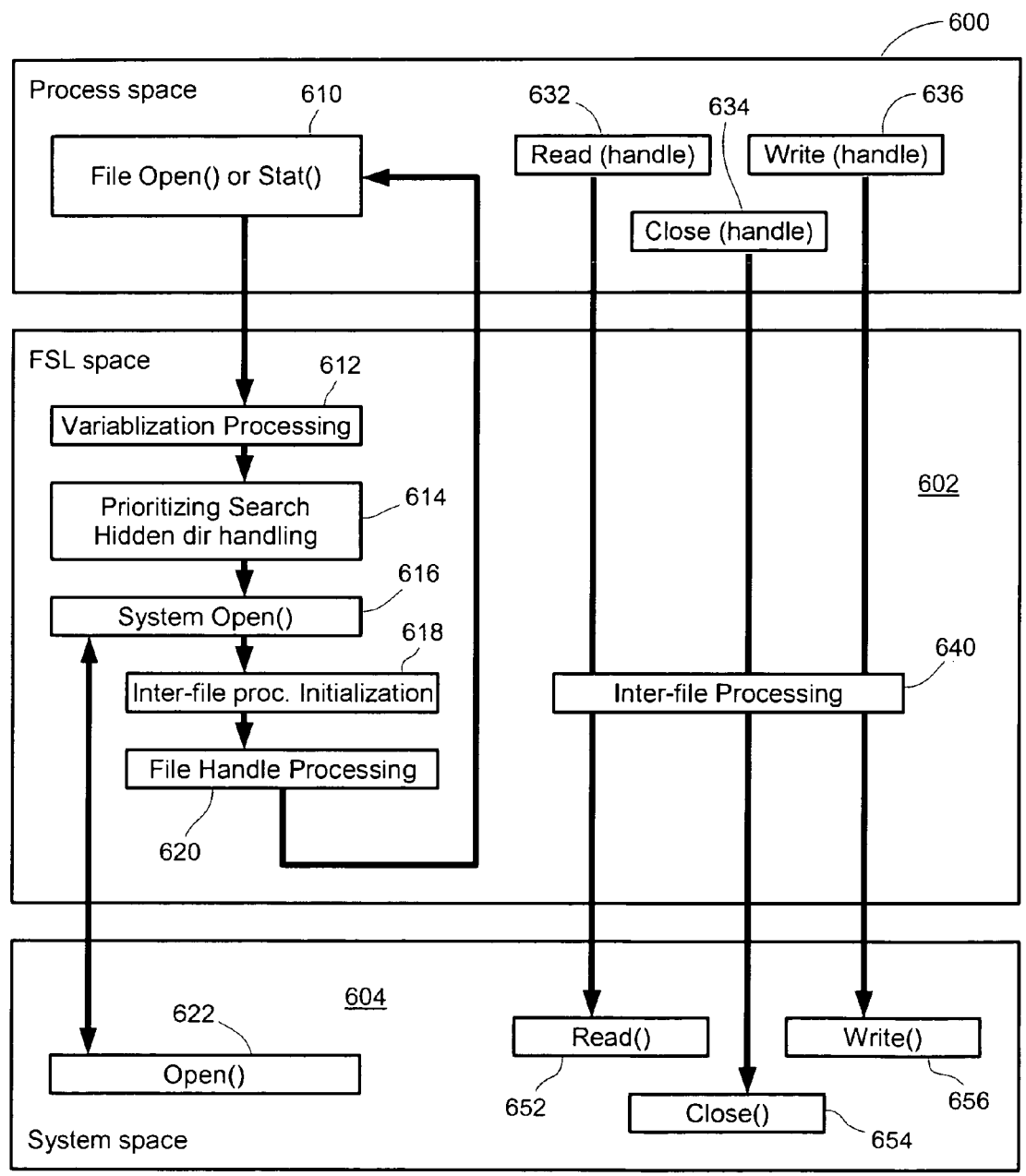
FIG. 6 conceptually illustrates exemplary layered system activities within the system, process and FSL spaces.

Apart from the process to application layer handling, the operation with respect to file operations of an exemplary layered computing system is conceptually depicted in FIG. 6. Activities occur in three spaces: the process space 600, during execution of processes; the system space 604 where basic operations occur at the operating system level; and the FSL space 602, in which operations are performed by the layered file system drivers between the process and system spaces. The file operations are divided between two groups, which are operations that require priority treatment and those that do not.

Operations 610 that require priority treatment include open( ) Stat( ) will typically require priority treatment because the file information reported by stat( ) will be specific to a file object potentially in more than one layer. Other file functions, such as opendir( ) for obtaining directory listings, are also included in this functional group, and are explained in detail in connection with virtualization.

When a file function 610 is called that requires prioritization treatment, the arguments are passed to a function in the FSL space 602. This can be done by redirection of the default system functions for open( ), stat( ) and like functions into the layered system driver. The first step performed in the FSL space 602 is variablization processing, which is explained more fully in the discussion of FIG. 8. A priority search is then conducted 614 to identify the layer or base file system that contains (or will contain for writes) the requested file. It is convenient at the same time to apply directory hiding, if layers are stored in directory structures on a base filesystem, preventing unauthorized or unintentional changes and confusion on the part of a user.

For stat( ) if the file object is located in a regular filesystem, the system stat( ) call can be used to get and return the appropriate data. For an open call, and upon locating a corresponding file in a layer or base filesystem (or for writes, locating the layer or base file system where the modifications will be recorded), the ordinary system open( ) may be called. At this point, there are two possibilities. The first is that the file handle returned by the system open( ) can be returned to the calling process. This may be the case where the returned file object exists as a file on a base filesystem that the operating system can read. This is the case represented in FIG. 6 by the use of the file system calls in space 604. In an alternative, layer contents can be stored within a larger file, as blocks on a storage device, or as a network accessible file or data. In those cases, special file operations functions can be crafted which operate in the place of the regular file system calls.

The second possibility also comes into play in an alternative operation. It may be that the file object is not stored in the same form as utilized by programs, for example if the file is compressed or encrypted by the layering system. In that case, inter-file processing needs to be done. That step, 618, is performed following the opening of the file object, which might be a lookup of an encryption key or merely a flag indicating that further processing is to receive specified treatment. If system file handles cannot be returned back to the originating process, the method utilizes substitute or virtual file handles 620 which refer to the virtual file objects.

The remaining file functions need no prioritization treatment, because prioritization has been applied using the open( ) call or another. A read call 632 is passed to the FSL subsystem for inter-file processing 640, if needed. The FSL subsystem makes any necessary reads 652, which might be system reads as described above. The same applies to writes 363, which may also be inter-file processed 640 and utilize a write function 656, which again can be a system write( ) in some cases. The inter-file processing may employ a buffer for an opened file if the specified processing so requires. For example, a compressed file may have been compressed with a particular block or window size, and thus processing 640 will maintain a buffer the size of that block or window plus the standard block size for files on the operating system. Calls to close 634 also pass through the inter-file processing, so as to permit any final processing to occur before file object is dereferenced in a final call to close 654.

Integration and Software Management Tools

A layering system may include tools to install, remove, and manage the layers on it. Although there are many ways of managing layers, and thus the application layers installed on a computer, a few are described here as examples.

In the first example, the layering system software is installed as a driver that intercepts system filesystem calls. The driver includes an interface for receiving commands to enable, disable, and perform other operations as desired, for example by defining a set of system calls. In that example, a custom application may be constructed that interfaces directly with the driver to command layer operations.

In a second example, a library is provided that defines an application programmer interface. Rather than using an application that interfaces directly with the driver, the library API is used. This facilitates the development of a manager application and other applications that require access to the layering system controls.

A manager application might be a textual application run from a shell, or it might be a graphical application that runs in a window. In the exemplary implementation below, the manager application is run from the shell, permitting remote applications control through the use of network protocols such as telnet or secure shell. In an alternative, a system may include an agent that supports custom access through a network, such as through the Windows Management Instrumentation (WMI) interface and protocol.

Additionally, a management tool can be made a component of a larger client computer management tool. This can be useful where a number of client computers are to be managed remotely, controlling the application software installed thereon through the layering system. The exemplary implementation below is one example of such a system.

Manager Application

For ease of configuring and managing a layering system, a manager application may be provided. The manager application permits an administrator or user to control the presentation of applications and data on a system, as well as other functions. A manager application may have facilities for importing and exporting layers, using a standard layer archive format. That archive format will advantageously be compressed, and may use standard archiving formats, for example those used by 'zip' or 'tar' type applications. A manager application provides a logical place to contain a facility for changing layered system software settings. A manager application might provide a viewer to view information about a layer. Likewise, a layer editor may be provided to edit certain layer information as desired. An editor might also be provided whereby registry settings and files can be added, removed, or changed in a layer. A facility for selecting, enabling, and disabling layers and layer groups may also be provided. Likewise, a facility for defining and editing layer groups may be included, as well as layer dependency information. A facility for deleting and installing layers may also be provided in that manager application. That application may also include an interface to cause layered system software to enter and exit capture modes.

A manager application may include an executable runnable from a shell or in a graphical user interface. Through that executable commands may be received whereby layers may be enabled, disabled, imported or otherwise controlled. A manager application may also include a network agent providing for control, access and the receipt of commands by network servers and other node types. A manager application may report the set of installed layers, and may also provide a report to a network requester which may be especially useful for remote application management. A manager application may also include a network facility to receive layers from a host, and optionally to remotely install those layers to the local computer.

Exemplary Implementation

The exemplary implementation is intended for a Microsoft Windows 2000, ME, XP or the like. Adaptations can be made for other versions of those operating systems, or to entirely different operating systems as will be understood by one of ordinary skill. In the exemplary implementation, application layers as described above are called Virtual Software Packages (VSPs), and exported layers are called Virtual Software Archives (VSAs).

Figure 3:
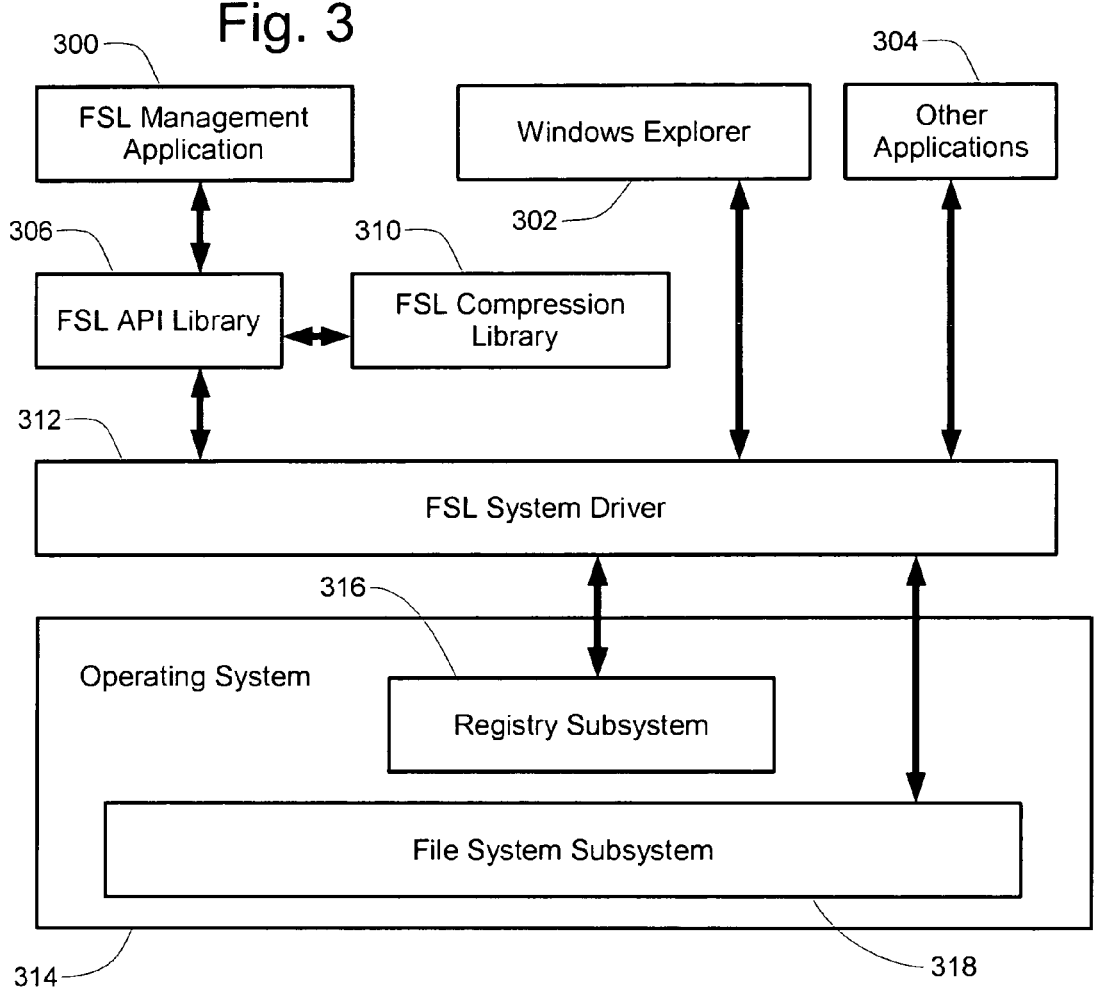
FIG. 3 conceptually shows an exemplary layered computing system architecture.

The architecture of the exemplary implementation is conceptually illustrated in FIG. 3. The architecture relies on one of the operating systems 314 noted above, which includes a registry subsystem 316 and a file system subsystem 318 for accessing and handling files. Installed to the operating system is an FSL system driver 312, which in the exemplary implementation is named "FSLX.SYS" and may reside in the system32/drivers directory of the Windows directory. That driver includes functions to replace the ordinary file system calls such as open, read, write, etc., other functions needed to manage layers in an enabled state, and functions for determining priorities.

A Windows explorer application 302, which is the usual application for reviewing and opening the contents of base filesystems, makes calls to the FSL driver 312 through the redirected file system calls, which makes enabled layers visible to the user. Other applications 304 can access the layers the same way through FSL driver 312.

An FSL management application 300 is provided in the exemplary implementation, which is named "SVScmd.exe". This application relies on FSL API library 306, which is named "FSLLIB32.DLL" and may reside under the Windows/system32 directory. Library 306 contains functions that implement an API to control operations to the FSL driver 312, including the following operations: activate layer, deactivate layer, import layer, export layer, rename layer, enumerate file/registry data and edit, enumerate/manage layers, view/edit layer properties, reset read-write layer or sublayer. A compression library 310 or application is included for exporting compressed VSAs and importing the same.

The SVScmd utility supports a number of commands as arguments, which are A[CTIVATE], D[EACTIVATE], R[ESET], I[MPORT], E[XPORT], DEL[ETE], REN[AME], C[APTURE], AUTO[ACTIVATE], P[ROPERTIES], CRE- ATE, VER[SION], ENUM[ERATE LAYERS], SEND [INVENTORY], H[ELP], SET [KEY], CHECKKEY (checking and displaying information about a product key), PRIORITY (adjusts a layer's priority settings) and EXEC [FROM LAYER] (Makes the process specified as running from the layer).

The exemplary implementation is controllable from the Real-Time System Manager Solution of Altiris of Lindon, Utah. Support is provided for that by a WMI agent, which provides much the same API access as the SVScmd program. The agent includes a DLL library and MOF file, both entitled AltirisVSProvider. The exemplary implementation includes a secondary manager application for network-management named SVSAdmin.exe, and also includes an FSIUL.DLL library and supporting language files. In the above management tools, a product key is required to successfully perform the requested layer control operations. The tools further define a set of administrators as a group that can perform layered operations, which may originally be the set of users with administrator privileges on client computers. It is to be recognized that another system could be fashioned without such limitations if desired.

The exemplary implementation supports variablization, and includes two sets of variables. The first set of variables are defined as the layered system boots. The second set is defined at the time of user login. The boot variables include %SYSTEMDRIVE% (the drive letter of the drive from which the operating system was booted) and %WINDIR% (the directory of the "windows" directory, which is sometimes "C:\Windows" or "C:\WinNT".) The user variables include settings such as %DESKTOP% (the desktop directory of the user, which might be C:\Documents and Settings\User\Desktop) and %USERPROFILE% (the profile directory of the user, which might be C:\Documents and Settings\User), and other settings such as the path to the "My Documents" directories and the like. Variables are stored by the layering system drivers, and in the exemplary implementation are made accessible to user processes and applications through environment variables.

In the exemplary implementation, certain tags are stored in paths in layers for variablization. "[B]" denotes the beginning of a variable name, and "[E]" denotes the end. "[CS]" is used to instruct a translation to a short path representation. A short path is a path that follows the older 8.3 filename convention (i.e. eight characters followed by a period followed by three characters.) A short path is determinable usually by the presence of a tilde character, which some older programs may use particulary in the registry. "[MSI]" instructs a translation to an installation path (by replacing a colon in an MSI path with a "?"). Other tags may be defined to further translate paths as needed.

In encoding virtual paths to variablized paths for storage as a file or registry reference in a layer, there may be some to which more than one variable would apply. In that case, the exemplary implementation favors longer variables over shorter ones, where longer means that more directories levels are included. For example, C:\Documents and Settings\User\Desktop\1.txt would convert to %DESKTOP%\1.txt and not %USERPROFILE%\Desktop\1.txt.

Not only may file paths variablized, but other settings as well. Registry settings that specify paths can be variablized. For example, an application might specify working or temporary directories, stored in registry settings. Variablizing the registry settings permits the application to be more portable. For layers that include exclusion or inclusion entries, these may also be variablized. For example, a data layer might contain an inclusion entry directing all writes to C:\Windows to the layer, thus protecting the system. The entry is better defined as a variablized path %WINDIR%, permitting the data layer to be transferred to another computer with a different Windows directory, for example C:\WinNT or D:\Windows. Data layer inclusion and exclusion entries and MSI paths may also be variablized.

The exemplary implementation stores layer file objects in a directory structure on a base filesystem, which is normally C:. The path to each layer's contents is %systemdrive%\fslrdr\#, where # is the unique identifier of the layer. Virtual paths with variables included are stored with the variables embedded in the true paths. For example, on a computer having one partition, the file "C:\Program Files\App\app.exe" would be stored as "C:\fslrdr\AppLayer\[B]PROGRAMFILES[E]\App\app.exe". Files residing virtually on a non-system drive (i.e. other than %systemdrive%) may be stored under a directory including a drive letter. Thus the file "D:\userfile.txt" might be stored under "C:\fslrdr\DataLayer\[DRIVED]\userfile.txt".

In the exemplary implementation, layer information is stored in the system registry under the HKLM\SYSTEM\Altiris\FSL\#, prefix, where # is replaced by the unique identifier of the layer. Alternatively, for operating systems without a system-wide registry, a registry or similar structure can be maintained by the layering drivers or other software. Each layer includes the following fields:

| Key | Value |
| --- | --- |
| ActivateTime | Last time the layer was activated |
| Active | 0 = inactive, 1 = active |
| ActiveOnStart | 1 if layer should be activated on system startup |
| CreateTime | Layer's time of creation |
| Enabled | Deprecated entry |
| FileRedirect | Path to the file redirection area |
| ID | GUID that identifies this layer (required to be unique) |
| MajorVersion | indicates layer format |
| MinorVersion | indicates layer format |
| Name | A name for this layer that is not required to be unique |
| PeerID | ID of companion sublayer |
| ReadOnly | 1 = readonly sublayer, 0 = readwrite sublayer |
| RefreshTime | Time that the layer was last reset |
| RegRedirect | Location in the registry for layer registry data |
| Type | 0 = RO, 1 = RW, 2 = Data |
| ShouldDelete (optional) | 1 indicates that the layer is to be lazily deleted |

In the exemplary implementation, just as virtual files in layers are stored in a directory structure on a base filesystem, virtual registry settings are stored in the system registry. Registry settings are also stored under the HKLM\SYSTEM\fslrdr\# prefix in the system registry. Layered registry entries need not be stored in a VSP, rather those entries can remain in the system registry for a layer marked disabled.

Further in the exemplary implementation, the layer definitions further include SVS extensions for OnEvent Actions. These layer specific entries are stored in the registry under HKLM\SYSTEM\Altiris\FSL\# with other layer definition attributes, and may contain the entries of OnPreActivate, OnPostActivate, OnPreDeactivate, OnPostDeactivate, OnPreImport, OnPostImport, OnPreExport, OnPostExport, OnPreReset, OnPostReset, OnPreDelete, OnPostDelete, OnPreCreate, OnPostCreate, OnPreCapture, and OnPostCapture. Also note that SVS also processes "run" entries in the layer's registry data and the files in the layer's "Startup" folders (for "user" and "all users".) Global SVS entries are stored in HKLM\SYSTEM\Altiris\FSL. Entries may use the REG_MULTI_SZ value type to store multiple actions for an event.

In the exemplary implementation, the root of the registry redirection area for each layer (HKLM\Software\FSL\#) contains representations of four registry root keys: HCC represents HKEY_CURRENT_CONFIG, HCU represents HKEY_CURRENT_USER, HLM represents HKEY_LOCAL_MACHINE, and HU represents HKEY_USERS. These keys contain the layer registry data that is overlayed when the layer is active.

The registry also contains areas labeled "ControlSetxxx" where "xxx" is a number value (usually 001, 002, or 003). At any one time only one of these areas is "current". The registry maintains a "pointer" to whichever controlset is being used. This is called "CurrentControlSet". Any registry activity directed at CurrentControlSet is redirected internally by the registry to the appropriate ControlSetxxx that is currently in use. Any activity going to the layer directed either at CurrentControlSet or ControlSetxxx (which is the active set) is redirected to CurrentControlSet in the layer.

Likewise, the registry redirects activity from HKCU to its real location HKEY_USER{userSID}. When activity is going to a layer, both of these areas are redirected to HCU. This is done for portability.

Similar to this, HKCR is a pointer to data contained in HKCU\Software\Classes and HKLM\Software\Classes. HKCR can be opened, queried, etc. Just like a normal registry key, but the data is really stored in these other locations. In a layer, the illusion of an HKCR key is not maintained. Data to this area goes into its real locations in the layer area. So, for example, if a create of a value was requested to HKCR and prioritization indicated the value was to go to a layer, it would go to HKLM\Software\fslrdr\#\HCU\Software\Classes.

When a layer is imported, all the registry and layer settings described above are also imported to the system registry, where the FSL driver can access conveniently. When a layer is disabled, the driver maintains these layer settings in the registry until the layer is removed from the system.

The exemplary implementation also supports file deletion entries, which are stored as a list of pathnames in %systemdrive%\fslrdr\#\DELLIST.TXT, where # is the layer ID. This is a unicode file, one entry per line. The exemplary implementation expands short filenames, so long file names are used to specify delections. Entry paths are variablized.

Registry entries that are deleted are also stored in the layer registry data in the system registry. A delete entry for a key is the key with ~FSL~ prepended to the original key name (e.g. "~FSL~Altiris" would hide "Altiris"). A delete entry for a value is a value with ~FSL~ prepended to the original value name. A deletion key other than "~FSL~" can be chosen if desired, provided that the necessary changes are also made to the layering driver software.

Exclude entries for files are also interpreted by the exemplary implementation, where they are entered under the subkey "Exclude", where the value name is the file extension or path of the exclude and the data contains the type. There are three types of entries, which are 0: file extensions, 1: directory path, subdirectories not included, and 2: directory path, subdirectories included (paths are variablized.)

Data layers in the exemplary implementation are identified in the registry with a "DataLayer" subkey. Entries can be made for a datalayer using the same format as the exclude subkey entries. A data layer so defined will capture all writes made that are not excluded.

In the exemplary implementation a VSP or layer can exist with one of four states. In a first state, deactivated or disabled, the layer exists on the computing device, but the layer contents are not visible or accessible to programs. Alternatively, in the enabled or activated state, the contents are visible and are made available for reading and possibly changing by programs. Layers in one of those two states are referred to as imported, because they are in a state of ready access and use by the layering system. In the exemplary implementation this means that the layer's registry entries and other information exist in the system registry, and are accessible to the FSL driver.

In a third layered state called "exported", the layer's file objects, registry settings and other information are encapsulated in a single object that can be transported. In that state a VSP becomes a VSA. In the exemplary implementation exported layers are encapsulated as archives in the PkZip format. Any sublayer is encapsulated in a subdirectory, with an identifying #.layer text file (where # again is the ID of the sublayer) containing the following entries: on line 1 is the layer name, on line 2 is the layer GUID (i.e. Globally Unique IDentifier), and on line 3 is the layer type (0:RO, 1=RW, 2=DATA). The parent layer likewise has a #.layer file of the same format, where # is the ID of the parent layer. For each layer and its sublayers, the contents are stored in a directory as follows. First, all the file objects in each layer are stored in a directory structure within the main directory in relative position to the path the file object is stored against the target directory structure. Thus, for the exemplary implementation, the %systemdrive%\fslrdr\# directory is simply copied into the archive. The DELLIST.TXT file containing file object deletions is included there. The exemplary exported layer contains three additional files, which are "fslreg1" containing the layer definition (reflecting what was or wound be stored in the registry), "fslreg2" containing the registry data of the layer, and "OSVER.INI" containing version information about the system that created the layer archive. A layer may also optionally include files containing other information, such as the number of file objects, registry keys and values, filesystem space used by the layer, or other information as desired.

Finally, a layer may be in a fourth state pending deletion. In the exemplary implementation, layers are not merely deleted, but are marked for deletion first. The reason for this is twofold. First, it may be that other disk operations are active, and it may be desirable to remove the layer's file objects, registry settings and information from the computing system at a later time, in a "lazy deletion" fashion. Second, it may be that files are open contained in a layer or processes are executing from the layer. Deletion of the layer at that time could cause an error, and therefore the exemplary implementation does not immediately delete a layer if objects remain open therein. As files are closed and processes terminated, the layered system software can re-evaluate whether it is prudent to remove the layer from the computing system. Alternatively, layer objects can be deleted at system startup or shutdown, particularly application layer objects that are unlikely to be needed for those activities.

Prioritization in the exemplary implementation is done through assigned priority values. The default priority values are as follows: a data layer, 45.5; a normal process owner, 55.5; a base process owner, 65.5; a base filesystem, 75.5; and a normal layer, 85.5 (higher values indicate lesser priority.) The meaning of "owner" in this context differs from prior uses; in this context a process owner layer means a determination that the file operation originates from a process related to or associated with the layer. So if a process is related to an application layer, that application layer will be assigned the normal process owner ("normal owner") priority, while other application layers are assigned the "normal layer" priority. Likewise, if a process is not related to a layer, it receives the base process owner ("base owner") priority. Note that for this prioritization, the base filesystems are counted as a layer and are not given special treatment. Also in this prioritization, note that should a .dll library exist in a non-owner layer and the base, the base takes priority under the presumption that that version is more trustworthy to applications generally.

The exception to this prioritization is for HKCR entries, again which registry entries define the default applications that are used when opening certain file types. If the layered drivers detect a read access to an HKCR entry, the default priorities are modified as follows: a normal owner, 55.5; a normal layer, 65.5; a base filesystem owner, 75.5; and base filesystems, 85.5. This prioritizes enabled application layers over the base filesystem, which generally directs open events to installed applications rather than to applications stored in the base, and thus installed applications take priority over the base so double-clicking opens the layer-installed application.

In the exemplary implementation, each layer can be assigned priority weights by an administrator or application provider over the default values, if desired. Four of these priorities are available for each layer. The first, called the "owner" priority, replaces the "normal owner" priority for that layer. Thus, when conducting a priority search, an application layer can be prioritized higher or lower than the normal or other layers. A second value defines the "normal" priority, which replaces the default "normal layer" priority above. By modifying these values, a layer can be guided into a position of lesser or greater priority. For example, a newer version of an application layer may be assigned slightly higher priority than and older version, ensuring that the new version is seen over the old should both be enabled in the layered system. The other two values are for HCKR registry entries, which are "HCKR owner" and "HCKR normal" and modify the default HCKR priorities. Through modification of these values an application layer can be prioritized higher, if the contained application is more favorably used than others for a given filetype, or lower, if the application is for only specialized use.

Figure 13A:
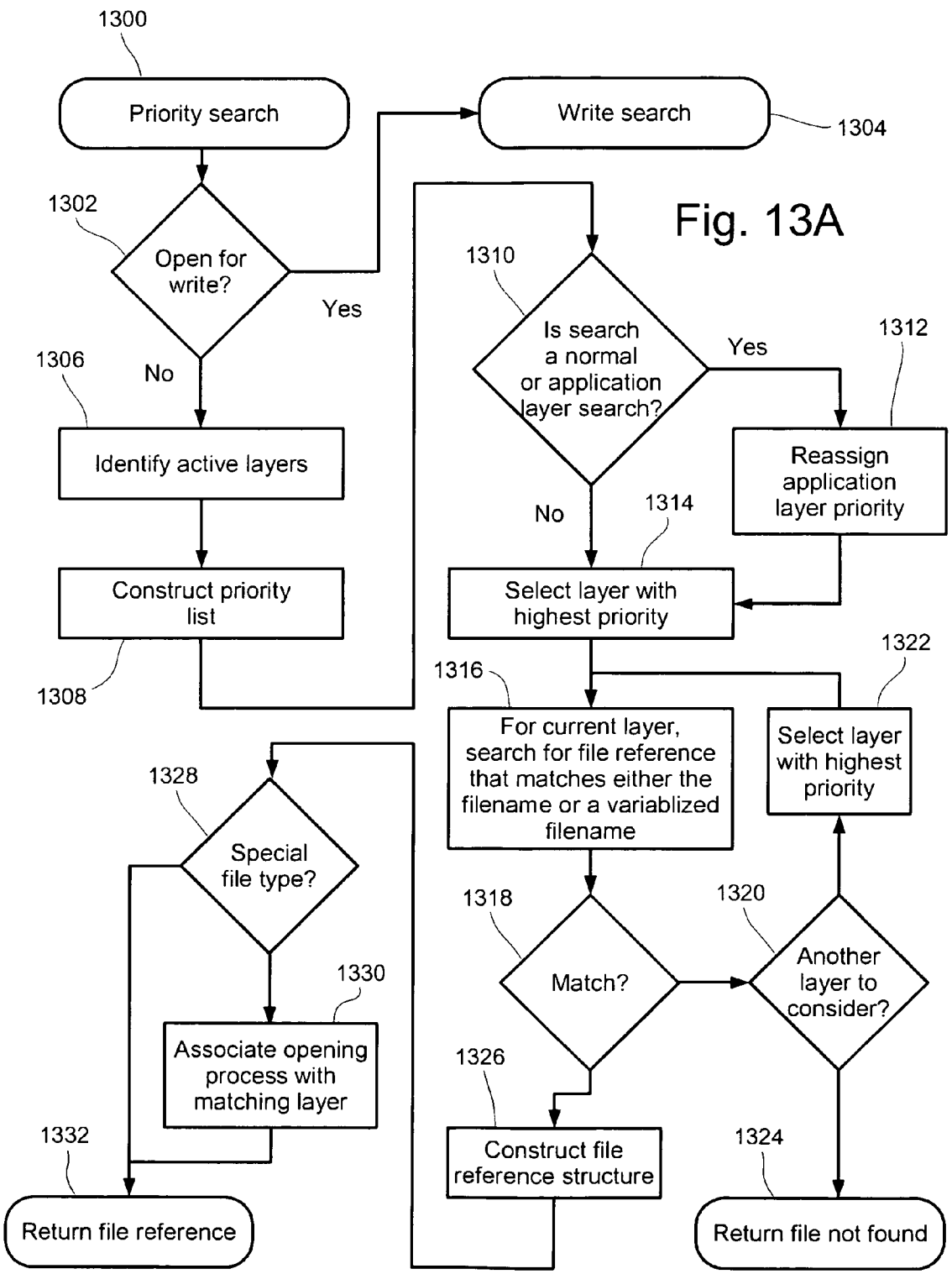
FIGS. 13A and 13B depict a method of performing priority searches in an exemplary layered system.
Figure 13B:
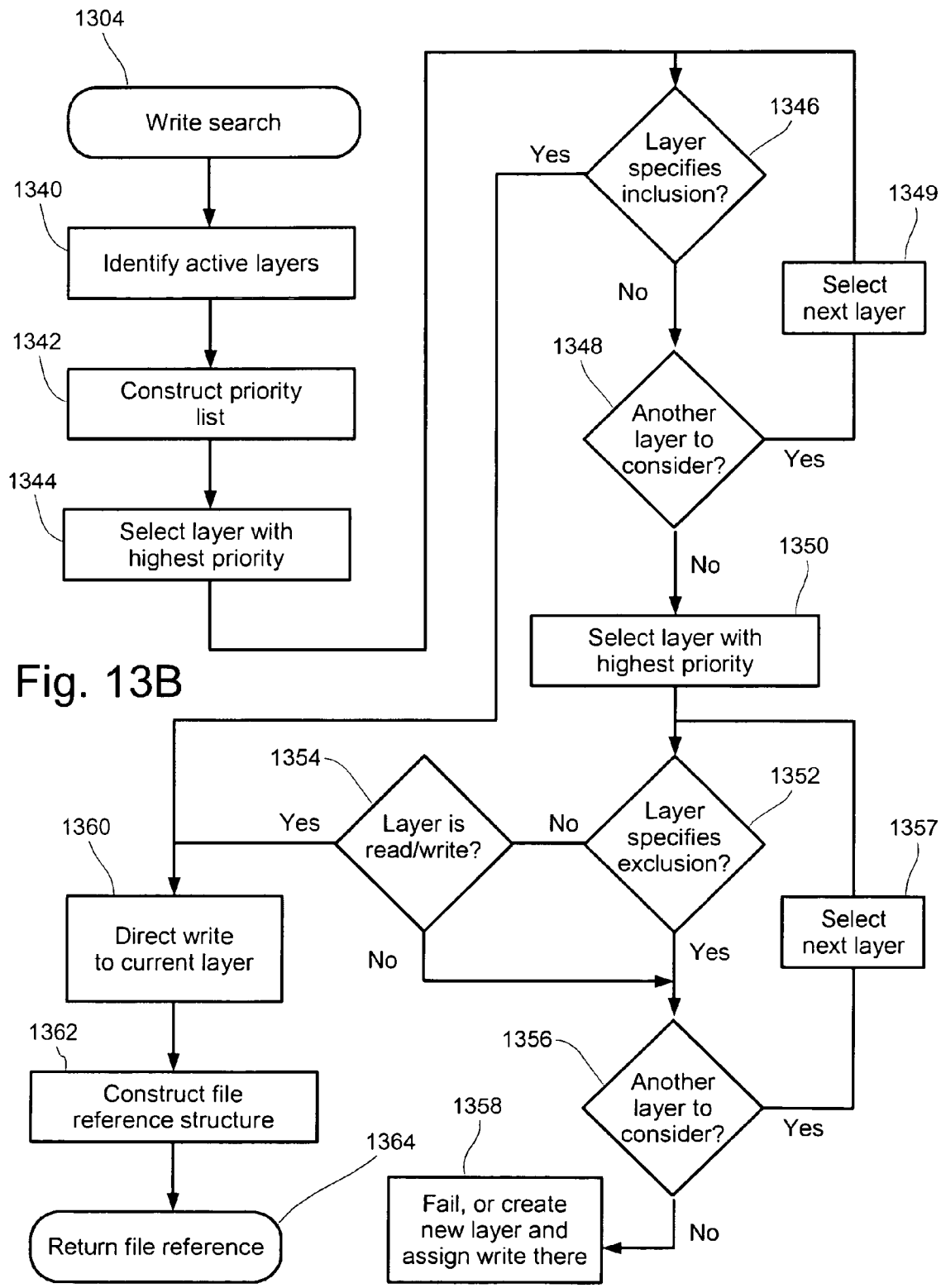

FIGS. 13A and 13B (hereinafter FIG. 13) conceptually illustrate a prioritization procedure used in the exemplary implementation, using weighted prioritization values. A priority search 1300 is started for each new file access or request to perform a file operation, which may be opening a file or directory, or requesting file status or information. Each access or request generally includes a file reference or path appropriate to a file system compatible with the operating system. The method of FIG. 13 divides read accesses from write accesses in step 1302, and open for write requests are continued at step 1304. Other accesses follow the general procedure, which begins by an identification of the active or enabled layers 1306 and construction of a priority list 1308 as reflected by the default prioritization values and any generic layer-configured values as described above. The determination of priority for searching the enabled layers and base filesystem(s) may also be performed by other than construction of a list. The priority list construction may reflect an HKCR read, and thus use the HKCR priorities. Next, the procedure considers 1310 whether there is an assigned layer to the process originating the file access. If the originating process is assigned, the priority list is adjusted 1312 to reflect the "owner" default priorities and any layer assigned "owner" priorities.

Next, the layers are evaluated in order starting with the layer assigned the highest priority 1314, searching for a corresponding file object. If two or more layers have the same priority, they may be considered in any order with respect to each other. In step 1316, a search for a file reference matching the file operation is performed, which search also considers variablized names. Should a match not be found 1318, the process repeats for the layer having the next highest priority 1322 until all layers have been considered 1320. Should all layers be traversed without a match, the procedure may report that a file was not found 1324, report another appropriate message indicating that no corresponding object could be accessed. Note that for some accesses, such as directory listings, all the layers should be traversed and step 1318 is not performed.

Continuing for an open operation, after finding a match a file reference structure is created in 1326. If the match was discovered in a base filesystem, the structure will correspond to a base file object. For a match to a layer, the structure will correspond to a virtual file object. The method then considers whether this access should be treated specially. In the method of FIG. 13, a trigger 1328 is made on a file type, one example of which will be described presently. If the trigger is found, the system associates the running process with the layer the file reference was discovered in. Finally, for open calls that read, a file reference is returned 1332 to the calling procedure, which may be a base or a virtual file handle.

The special treatment of steps 1328 and 1330 can provide improved treatment for application updates made through a standard installation process, such as the Microsoft Installer (MSI.) Through an installation process, an application may request a modular add-on installation, should the application discover that a module is needed by a user. It may be preferred that any add-on installation be captured to the application's layer, rather than appearing in the base or in another layer. The MSI service, as with other services, operates as a system process by inter-process communication. Thus when an application requests a new installation, repair, or other installation activity, it sends a message to the MSI requesting the operation. As the MSI is a system process running potentially from a base filesystem, that process is likely not assigned to a layer. Thus in a layering system that relies on process tracking only, those files installed by a service will not be deposited to the application layer.

The exemplary implementation in step 1328 detects a read of an MSI package file, which accompany applications that may later install files. The MSI process is then assigned to the application layer in which the MSI installation file resides while the installation proceeds, specifically in the read-write sublayer of the application layer. The assignment may be released at a later time as appropriate. This concept can be extended to other services that may deposit files on the computing system, such as a network service, logging service or print spooler.

For writes, the procedure set forth in FIG. 13B is followed. As for reads, active/enabled layers are identified 1340, and a priority list constructed 1342 for those layers. The priority list constructed in 1342 may omit layers configured to be read-only. A loop then proceeds to discover the appropriate layer to which the write should be destined, starting from the layer having the highest priority 1344. This write procedure differs in that it considers exclusion and/or inclusion entries in layer definitions. First the layers are traversed for a layer that specifies inclusion of the file, 1346, 1347 and 1348. If no layer specifies inclusion, the method starts again with the layer of highest priority 1350 looking at exclusion entries. If a layer does not specify exclusion 1352 and is a read-write layer 1354, the destination is considered to be found. The layers are traversed in priority 1356 and 1357 until either a layer is found, and if no layer is found to which the write operation may be directed, the process may either fail 1358 or create a new read-write layer for the write operation. If a destination layer is found, the write operation is directed to the currently selected layer 1360. A file reference structure is created 1362 and a reference returned to the calling process 1364, which may be a virtual or base file handle.

For example, a layer A contains a.exe and c:\windows\common.dll. A base filesystem contains b.exe and c:\windows\common.dll. Layer A is activated and a.exe is launched (a.exe process' owner layer is layer A.) Layer B is then activated. a.exe does a file open operation for c: \windows\ common.dll. For prioritization, the driver first assigns layer A a priority of 55.5 as the normal owner. Layer B is assigned a priority of 85.5 as a "normal" layer. The base is assigned a priority of 75.5. The search order is layer A, the base, and finally layer B. As layer A contains the requested file, the access is directed to layer A.

b.exe is launched (b.exe process' owner layer is the base.) b.exe does a file open operation for c:\windows\common.dll. Layer A has a priority of 85.5 (as a "normal" layer), Layer B a priority of 85.5 (also a "normal" layer), and the base is assigned a priority of 65.5. The base takes higher priority, and the dll is delivered from the base.

In another example, a Firefox application layer is created with the proper registry entries in HKCR so that Firefox is registered to handle html files. The layer maintains the default HKCR priority. A second Opera application layer is also created having a HKCR registry entries making Opera registered to handle html files. The Opera layer is set with an HKCR priority of 65.4.

First, the Firefox layer is activated, and the user double clicks a html file on the desktop. The explorer goes to the registry to determine what program handles html files. The layered driver assigns the Firefox layer a priority of 65.5, and the base a priority of 85.5. Finding an HKCR entry for html files in the Firefox layer, the system directs that Firefox.exe is launched for the html file and the base need not be searched.

The Opera layer is then activated, with the Firefox layer still enabled. The user double clicks a html file on the desktop. Explorer again goes to the registry to determine what program handles html files. The Firefox layer takes a priority of 65.5. The Opera layer specifies a priority of 65.4. The base a default priority of 85.5. The search order is determined to be the Opera layer, Firefox layer, and then the base. As the Opera layer has an HKCR entry for HTML files, the open request is directed through it's HKCR entry to the opera.exe file in the Opera layer.

The exemplary implementation also provides for handling of services that may be provided in layers. Service definitions may exist in multiple layers and the base. The control data of services are stored in a subkey "services" to the read-only layer definition of an application layer in the registry. The data for a service is stored in a key named "FSL_{service name}". Other keys named for the service include PreActivate, PostActivate, PreDeactivate and PostDeactivate. Each of these keys may contain subkeys from 1 to 4 which proceed in increasing order. Each numbered subkey contains a command and a service name. The numbered subkeys take the following meanings: 1-create service (registers the service with the Service Control Manager, SCM), 2-start service, 3-stop service, and 4-delete service (unregisters the service with the SCM).

Furthermore, the exemplary implementation delays deactivating a layer containing a service entry until all the declared services complete or terminate. However, if a service is declared in two layers, the service is not stopped until the last layer declaring it is deactivated. For this purpose, reference counts are maintained in the system registry under HKLM\SYSTEM\Altiris\FSL\Services.

Finally, for the exemplary implementation, layers may at certain times be required to disable, for example at system shutdown or if commanded by a management application. In that case, applications are attempted to be terminated gracefully. When a layer is forced to be disabled, the layered system sends a terminate signal to all associated processes, and waits for those processes to terminate before disabling the layer. The layered system may also wait for open files directed to the disabling layer to be closed before disabling the layer, or it may alternatively disallow further opens to the layer and permit the running applications to continue to access their open files. If a user does not respond to application queries (i.e. "do you want to save this file?") the system can become locked pending user action.

The AutoClose function can prevent this lock-up. Stored in the registry are two global entries under the keys "AutoCloseApps" and "AutoCloseTimeout" under HKLM\SYSTEM\Altiris\FSL. The "AutoCloseApps" controls whether applications are terminated automatically on layer deactivation, and may be set to 1 by default. The AutoCloseTimeout value determines the number in seconds to wait if AutoClose is on for a layer, for example 30 seconds. The global entries can be overridden by entries of the same keys in the layer definition in HKLM\SYSTEM\Altiris\FSL\#.

While the present systems, products and methods have been described and illustrated in conjunction with a number of specific configurations, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed is:

1. A layered computing system discriminating a priority among a plurality of enabled layers of different types located on storage of the system, the types of layers recognized by the system including an application layer type and a data layer type, and wherein layers identified as data layers carry file reference information determining which files may be written therein, said system comprising:
   a processor;
   data and program storage accessible by said processor, said storage comprising one or more data storage devices;
   an operating system stored to said storage;
   computer readable instructions located to said program storage, wherein said instructions are configured to be executed by said processor to perform the functions of:
   (i) receiving from an application a request to perform a file operation, that request containing a file reference appropriate to a file system,
   (ii) identifying a set of enabled layers,
   (iii) determining a priority for searching the enabled layers and a base filesystem,
   (iv) performing a search for the file object corresponding to the file reference, the search performed in order of the determined priority,
   (v) when, in performing the search for a non-write request, a file object having priority is found corresponding to the file reference in a layer, returning a virtual file handle to that virtual file object, (vi) when, in performing the search, a file object is not found corresponding to the file reference, and when the request was not a write request, returning a result indicating that no file object corresponding to the file reference can be accessed, (vii) for a write request:
(a) reading the file reference information carried with a data layer;
(b) comparing the file reference requested against the file reference information of a data layer; and
(c) when, while performing the search, a data layer is encountered with file reference information permitting writing of the requested file reference to that data layer, finding a virtual file object in that data layer and returning a virtual file handle to that virtual file object, wherein a data layer containing inclusion or exclusion entries that determine which files may be written therein is prioritized before any read-write application layers or sublayers to capture certain files and avoid deposition into the application layers.

2. A layered computing system according to claim 1, wherein a layer specifies where the layer fits within a priority scheme for searching the enabled layers and a base filesystem.

3. A layered computing system according to claim 1, wherein a layer carries information that instructs the layered computing system to prioritize the layer before or after other identified layers or base filesystems.

4. A layered computing system according to claim 1, wherein layers included within the enabled layers carry priority weights relative to other layers or base filesystems.

5. A layered computing system according to claim 4, wherein the priority weights are numeric values.

6. A set of non-transitory computer readable media containing computer instructions for discriminating a priority among a plurality of enabled layers of different types located on storage accessible by a layered computing system, the types of layers recognized by the system including an application layer type and a data layer type, and wherein layers identified as data layers carry file reference information determining which files may be written therein, the set of computer readable media comprising at least one medium upon which is stored the computer instructions executable by a computing system to achieve the functions of:

(i) receiving from an application a request to perform a file operation, that request containing a file reference appropriate to a file system,
(ii) identifying a set of enabled layers,
(iii) determining a priority for searching the enabled layers and a base filesystem,
(iv) performing a search for the file object corresponding to the file reference, the search performed in order of the determined priority,
(v) when, in performing the search for a non-write request, a file object having priority is found corresponding to the file reference in a layer, returning a virtual file handle to that virtual file object,
(vi) when, in performing the search, a file object is not found corresponding to the file reference, and when the request was not a write request, returning a result indicating that no file object corresponding to the file reference can be accessed,
(vii) for a write request:
(a) reading the file reference information carried with a data layer,
(b) comparing the file reference requested against the file reference information of a data layer, and
(c) when, while performing the search a data layer is encountered with file reference information permitting writing of the requested file reference to that data layer, finding a virtual file object in that data layer and returning a virtual file handle to that virtual file object, wherein a data layer containing inclusion or exclusion entries that determine which files may be written therein is prioritized before any read-write application layers or sublayers to capture certain files and avoid deposition into the application layers.

7. A set of non-transitory computer readable media according to claim 6, wherein the file reference information of a data layer contains exclusion entries indicating that certain files are not to be written to the data layer, and wherein for write requests said instructions are further configured to perform the functions of:

(viii) reading the file exclusion entries of an enabled data layer;
(ix) for requested file write operations, comparing the file reference against the file exclusion entries of a data layer;
(x) disallowing a finding of a virtual file object in a data layer containing a file exclusion entry corresponding to the file reference of a requested file write operation.

8. A set of non-transitory computer readable media according to claim 7, wherein an exclusion entry contains a file type or extension, and wherein said instructions are further configured to disallow a finding of a virtual file object in a data layer containing a file exclusion entry corresponding to the type of file of a requested file write operation.

9. A set of non-transitory computer readable media according to claim 7, wherein an exclusion entry contains a directory specification, and wherein said instructions are further configured to disallow a finding of a virtual file object in a data layer containing a file exclusion entry corresponding to the directory of the file reference of a requested file write operation.

10. A set of non-transitory computer readable media according to claim 6, wherein an inclusion or exclusion entry is defined for a path.

11. A set of non-transitory computer readable media according to claim 6, wherein
exclusion entries for user file types and directories are included within file reference information carried with an application layer.

12. A set of non-transitory computer readable media according to claim 6, wherein the file reference information of a data layer contains inclusion entries indicating that certain files are to be written to the data layer, and wherein for write requests said instructions are further configured to perform the functions of:

(viii) reading the file inclusion entries of an enabled data layer;
(ix) reading requested file write operations, comparing the file reference against the file inclusion entries of a data layer;
(x) allowing a finding of a virtual file object in a data layer containing a file inclusion entry corresponding to the file reference of a requested file write operation.

13. A set of non-transitory computer readable media according to claim 6, wherein said instructions are further configured to operate a layer manager application that can receive layers from a network host, and command enablement, disablement and importation of layers so that, upon enabling, a layer overlays its contents to the base filesystem and, upon disabling, contents of a layer no longer appear to processes of the operating system.

14. A method of discriminating a priority among a plurality of enabled layers of different types located on storage accessible by a layered computing system, the types of layers recognized by the system including an application layer type and a data layer type, and wherein layers identified as data layers carry file reference information determining which files may be written therein, the method comprising the steps of:

receiving from an application a request to perform a file operation, that request containing a file reference appropriate to a file system;

identifying a set of enabled layers;

determining a priority for searching the enabled layers and a base filesystem;

performing a search for the file object corresponding to the file reference, the search performed in order of the determined priority;

when, in performing the search for a non-write request, a file object having priority is found corresponding to the file reference in a layer, returning a virtual file handle to that virtual file object;

when, in performing the search, a file object is not found corresponding to the file reference, and when the request was not a write request, returning a result indicating that no file object corresponding to the file reference can be accessed;

for a write request:
(a) reading the file reference information carried with a data layer;
(b) comparing the file reference requested against the file reference information of a data layer; and
(c) when, while performing the search, a data layer is encountered with file reference information permitting writing of the requested file reference to that data layer, finding a virtual file object in that data layer and returning a virtual file handle to that virtual file object, wherein the search order for non-write requests is different than for write requests.

15. A method according to claim 14 wherein the file reference information of a data layer contains exclusion entries indicating that certain files are not to be written to the data layer, said method further comprising the steps of:

reading the file exclusion entries of an enabled data layer;

for requested file write operations, comparing the file reference against the file exclusion entries of a data layer;

disallowing a finding of a virtual file object in a data layer containing a file exclusion entry corresponding to the file reference of a requested file write operation.

16. A method according to claim 15 wherein an exclusion entry contains a file type or extension, and wherein the finding of a virtual file object in a data layer containing a file exclusion entry corresponding to the type of file of a requested file write operation is disallowed.

17. A method according to claim 15 wherein an exclusion entry contains a directory specification, and wherein the finding of a virtual file object in a data layer containing a file exclusion entry corresponding to the directory of the file reference of a requested file write operation is disallowed.

18. A method according to claim 14, wherein a layer identified as a data layer is prioritized after any read-write application layers or sublayers to catch files not written to other layers.

19. A method according to claim 14, wherein a data layer containing inclusion or exclusion entries is prioritized before any read-write application layers or sublayers to capture certain files and avoid deposition into the application layers.

20. A method according to claim 14, wherein the file reference information of a data layer contains inclusion entries indicating that certain files are to be written to the data layer, and wherein said method further comprises the steps of:

reading the file inclusion entries of an enabled data layer;

for requested file write operations, comparing the file reference against the file inclusion entries of a data layer;

allowing a finding of a virtual file object in a data layer containing a file inclusion entry corresponding to the file reference of a requested file write operation, wherein finding the virtual file object in the data layer comprises creating a file reference structure in the data layer, the virtual file object comprising the file reference structure.

* * * * *